US009130837B2

United States Patent
Bjarnason et al.

(10) Patent No.: US 9,130,837 B2
(45) Date of Patent: Sep. 8, 2015

(54) SYSTEM AND METHOD FOR ENABLING UNCONFIGURED DEVICES TO JOIN AN AUTONOMIC NETWORK IN A SECURE MANNER

(75) Inventors: Steinthor Bjarnason, Fjerdingby (NO); Michael H. Behringer, La Colle sur Loup (FR); Yves Francis Eugene Hertoghs, Schilde (BE); Max Pritikin, Boulder, CO (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 195 days.

(21) Appl. No.: 13/478,030

(22) Filed: May 22, 2012

(65) Prior Publication Data

US 2013/0318343 A1 Nov. 28, 2013

(51) Int. Cl.
*H04L 12/24* (2006.01)
*H04L 29/06* (2006.01)

(52) U.S. Cl.
CPC .......... *H04L 41/0809* (2013.01); *H04L 63/061* (2013.01); *H04L 63/0823* (2013.01); *H04L 63/0876* (2013.01)

(58) Field of Classification Search
CPC ............ H04L 63/0884; H04L 63/0876; H04L 63/061; H04L 63/0823; H04L 63/0809
USPC .............................................. 713/157; 726/5
See application file for complete search history.

(56) References Cited

U.S. PATENT DOCUMENTS

| 7,451,305 | B1 | 11/2008 | Pritikin |
| 8,010,640 | B2 * | 8/2011 | Aune et al. ................... 709/222 |
| 8,095,788 | B2 | 1/2012 | Vilhuber et al. |
| 8,555,338 | B2 * | 10/2013 | Gur et al. ........................ 726/2 |
| 2004/0250072 | A1 * | 12/2004 | Ylonen ........................ 713/170 |
| 2005/0246770 | A1 * | 11/2005 | Hunt et al. ..................... 726/17 |
| 2005/0246771 | A1 * | 11/2005 | Hunt et al. ..................... 726/18 |

(Continued)

FOREIGN PATENT DOCUMENTS

| WO | WO2013/176689 | 11/2013 |
| WO | WO2013/177069 | 11/2013 |

OTHER PUBLICATIONS

Andreas Klenk; Automated Trust Negotiation in Autonomic Environments; France Telecom; Year: 2007; p. 96-112.*

(Continued)

*Primary Examiner* — Monjour Rahim
(74) *Attorney, Agent, or Firm* — Patent Capital Group

(57) ABSTRACT

A method in an example embodiment includes creating an initial information package for a device in a domain of a network environment when the device is unconfigured. The method further includes communicating the initial information package to a signing authority, receiving an authorization token from the signing authority, and sending the authorization token to the unconfigured device, where the unconfigured device validates the authorization token based on a credential in the unconfigured device. In more specific embodiments, the initial information package includes a unique device identifier of the unconfigured device and a domain identifier of the domain. In further embodiments, the signing authority creates the authorization token by applying an authorization signature to the unique device identifier and the domain identifier. In other embodiments, the method includes receiving an audit history report of the unconfigured device and applying a policy to the device based on the audit history report.

21 Claims, 9 Drawing Sheets

(56) References Cited

U.S. PATENT DOCUMENTS

| | | | |
|---|---|---|---|
| 2006/0077945 | A1 | 4/2006 | KethiReddy et al. |
| 2007/0101400 | A1* | 5/2007 | Freeman et al. ............... 726/2 |
| 2008/0028436 | A1 | 1/2008 | Hannel et al. |
| 2008/0086760 | A1 | 4/2008 | Jiang et al. |
| 2008/0307516 | A1 | 12/2008 | Levy-Abegnoli |
| 2010/0306352 | A1 | 12/2010 | Pritikin et al. |
| 2010/0306827 | A1 | 12/2010 | Balducci et al. |
| 2011/0161659 | A1* | 6/2011 | Himawan et al. ............ 713/156 |
| 2011/0302638 | A1* | 12/2011 | Cha et al. ...................... 726/6 |
| 2012/0066320 | A1 | 3/2012 | Taniuchi |
| 2012/0167185 | A1* | 6/2012 | Menezes et al. ............... 726/5 |
| 2013/0237283 | A1* | 9/2013 | Harrison et al. ............ 455/557 |
| 2013/0318570 | A1 | 11/2013 | Balaji et al. |

OTHER PUBLICATIONS

"Cisco Discovery Protocol," Wikipedia, 1 page, [Retrieved and printed May 22, 2012] http://en.wikipedia.org/wiki/Cisco_Discovery_Protocol.

"Neighbor Router Authentication: Overview Guidelines," webpages, Cisco IOS Security Configuration Guide, pp. 1-6, [Retrieved and printed May 22, 2012]. http://www.cisco.com/en/US/docs/ios/12_2/security/configuration/guide/scfroutr.html.

"Routing Protocol Security Requirements (rpsec) (concluded WG)," pp. 1, [Retrieved and printed May 22, 2012] http://datatracker,ietf.org/wg/rpsec/charter.

"Secure Neighbor Discovery Protocol," Wikipedia, 2 pages [Retrieved and printed May 22, 2012] http://en.wikipedia.org/wiki/Secure_Neighbor_Discovery_Protocol.

"IEEE 802.1AR—IEEE Standard for Local and Metropolitan Area Networks—Secure Device Identity," IEEE Std. 802.1AR-2009, Dec. 22, 2009; 76 pages.

"IEEE 802.1X," Wikipedia, http://en.wikipedia.org/wiki/IEEE_802.1X, 7 pages [Retrieved and printed May 22, 2012].

"IEEE 802.1X-2004—Port Based Network Access Control," http://www.ieee802.org/1/pages/802.1x-2004.html, May 23, 2008, 3 pages.

"Link Layer Discovery Protocol," Wikipedia, pp. 1-3, [Retrieved and printed May 22, 2012] http://en.wikipedia.org/wiki/Link_Layer_Discovery_Protocol.

PCT Aug. 27, 2013 International Search Report and Written Opinion from International Application Serial No. PCT/US2013/041878; 11 pages.

Arkko, J., et al., "Secure Neighbor Discovery (SEND)," RFC3971, Mar. 2005; 57 pages.

Narten, et al., "Neighbor Discovery for IP version 6 (IPv6)," RFC 4861, Sep. 2007, pp. 56-97; http://tools.ietf.org/html/rfc4861.

Van Oorschot, P.C., et al., "On Interdomain Routing Security and Pretty Secure BGP (psBGP)," ACM Transactions on Information and System Security, vol. 10, No. 3, Jul. 3, 2007.

USPTO Jun. 21, 2013 Non-Final Office Action from U.S. Appl. No. 13/477,913.

USPTO Jan. 14, 2014 Final Office Action from U.S. Appl. No. 13/477,913.

PCT Oct. 15, 2013 International Search Report from International Application No. PCT/US12/48527; 6 pages.

PCT Nov. 25, 2014 International Preliminary Report on Patentability and Written Opinion from the International Searching Authority from International Application Serial No. PCT/US2013/041878; 11 pages.

USPTO Mar. 25, 2015 Non-Final Office Action from U.S. Appl. No. 13/477,913.

U.S. Appl. No. 13/477,913, filed May 22, 2012, entitled "Using Neighbor Discovery to Create Trust Information for Other Applications," Inventors: Steinthor Bjarnason, et al.

"The Public Key Infrastructure Approach to Security," Oracle9i Security Overview, Release 2 (9.2) Part No. A96582-01, © 2001-2002 Oracle Corporation, 8 pages http://docs.oracle.com/cd/B10500_01/network.920/a96582/pki.htm.

Cisco Systems, Inc., "Unique Device Identifier Retrieval," © 2003-2006 Cisco Systems, Inc., 12 pages; http://www.cisco.com/en/US/docs/ios/12_3t/12_3t4/feature/guide/gtpepudi.html.

Cisco, Understanding Cisco TrustSec, Revised Jun. 16, 2011, 10 pages http://www.cisco.com/en/US/docs/switches/lan/trustsec/configuration/guide/arch_over.html.

Cooper, et al., "Internet X.509 Public Key Infrastructure Certificate and Certificate Revocation List (CRL) Profile," Network Working Group RFC 5280, May 2008, 166 pages; http://www.ietf.org/rfc/rfc5280.txt.

Interopnet Labs, "What is EAP-FAST?" InteropNet Labs Full Spectrum Security Initiative (May 2005), 1 page http://www.opus1.com/nac/whitepapers-old/e-eapfast-lv05.pdf.

* cited by examiner

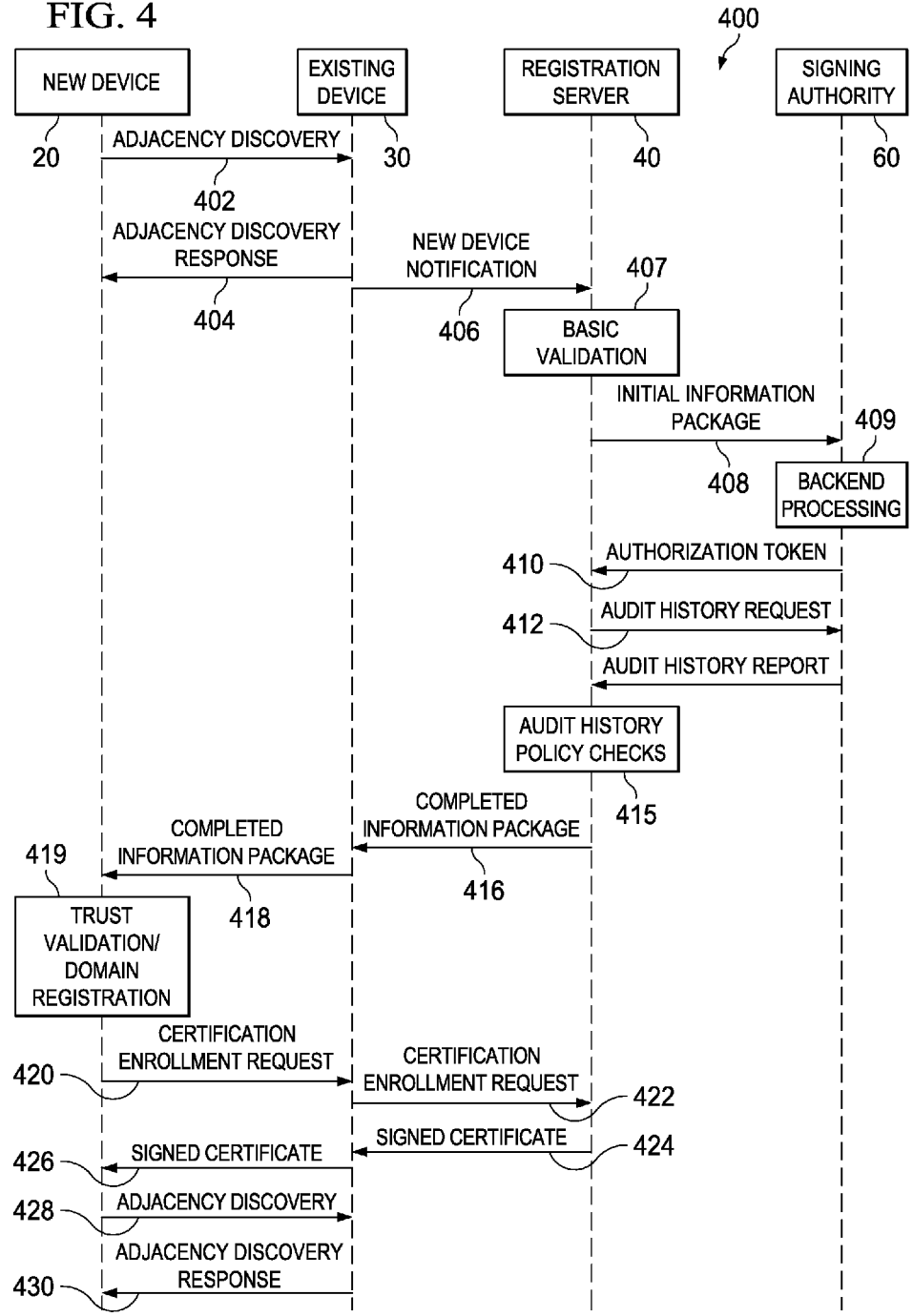

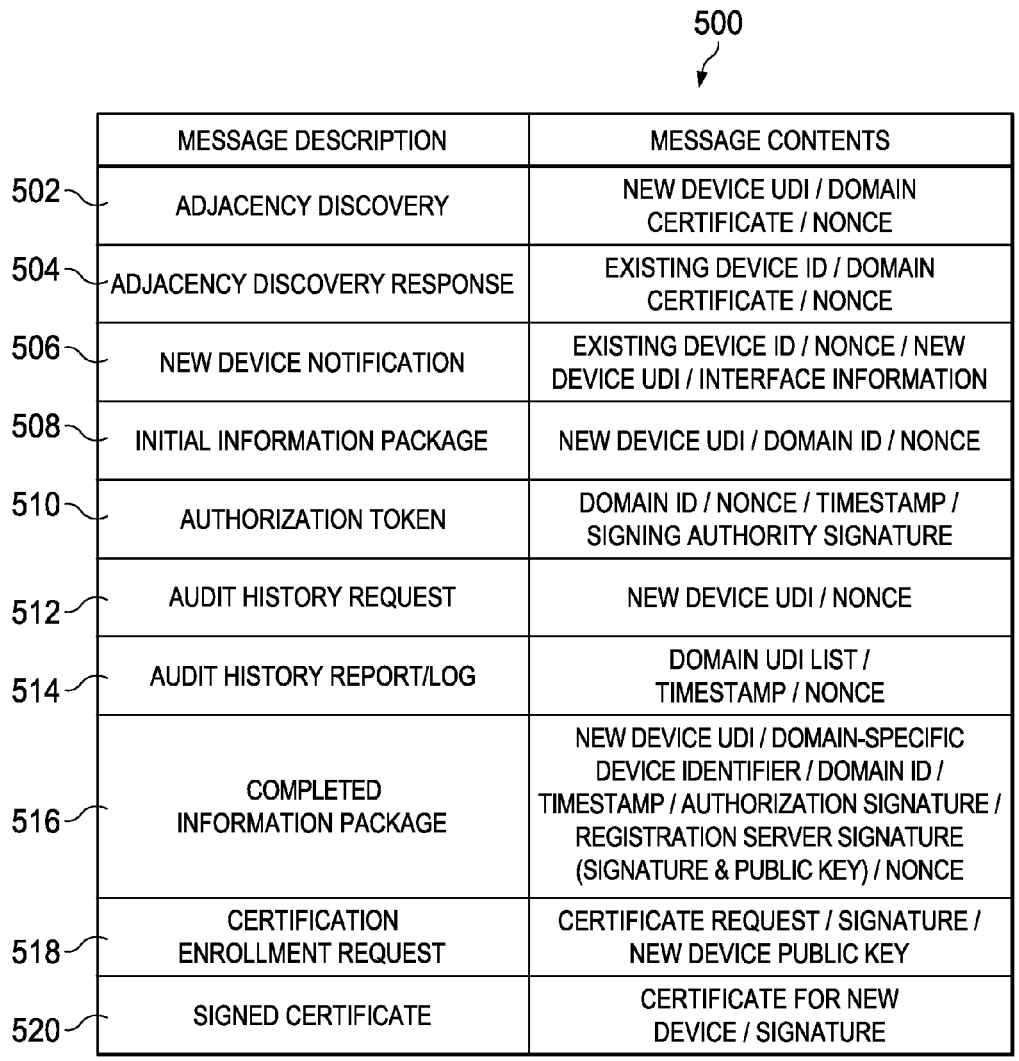

| MESSAGE DESCRIPTION | MESSAGE CONTENTS |
|---|---|
| ADJACENCY DISCOVERY | NEW DEVICE UDI / DOMAIN CERTIFICATE / NONCE |
| ADJACENCY DISCOVERY RESPONSE | EXISTING DEVICE ID / DOMAIN CERTIFICATE / NONCE |
| NEW DEVICE NOTIFICATION | EXISTING DEVICE ID / NONCE / NEW DEVICE UDI / INTERFACE INFORMATION |
| INITIAL INFORMATION PACKAGE | NEW DEVICE UDI / DOMAIN ID / NONCE |
| AUTHORIZATION TOKEN | DOMAIN ID / NONCE / TIMESTAMP / SIGNING AUTHORITY SIGNATURE |
| AUDIT HISTORY REQUEST | NEW DEVICE UDI / NONCE |
| AUDIT HISTORY REPORT/LOG | DOMAIN UDI LIST / TIMESTAMP / NONCE |
| COMPLETED INFORMATION PACKAGE | NEW DEVICE UDI / DOMAIN-SPECIFIC DEVICE IDENTIFIER / DOMAIN ID / TIMESTAMP / AUTHORIZATION SIGNATURE / REGISTRATION SERVER SIGNATURE (SIGNATURE & PUBLIC KEY) / NONCE |
| CERTIFICATION ENROLLMENT REQUEST | CERTIFICATE REQUEST / SIGNATURE / NEW DEVICE PUBLIC KEY |
| SIGNED CERTIFICATE | CERTIFICATE FOR NEW DEVICE / SIGNATURE |

FIG. 5

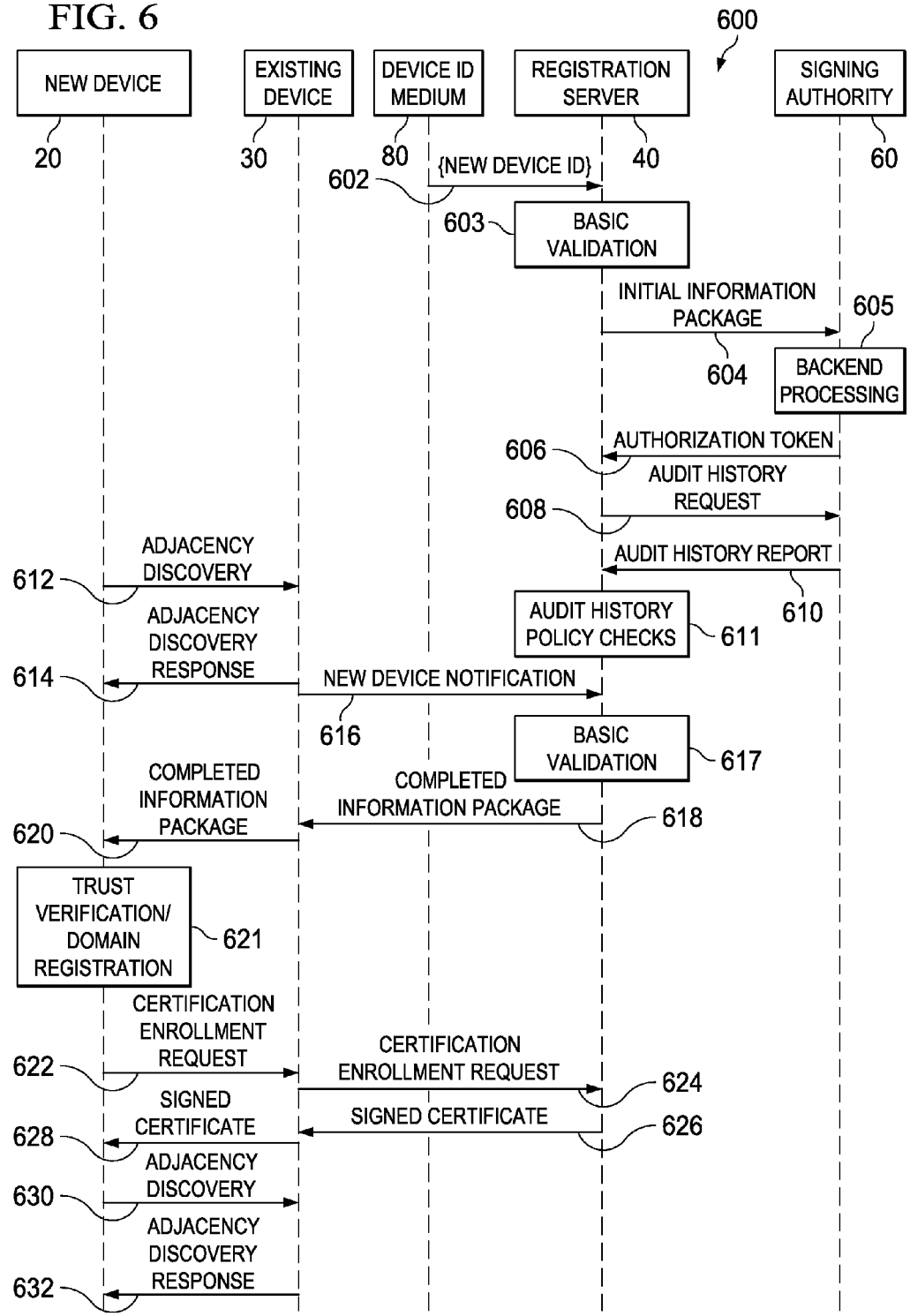

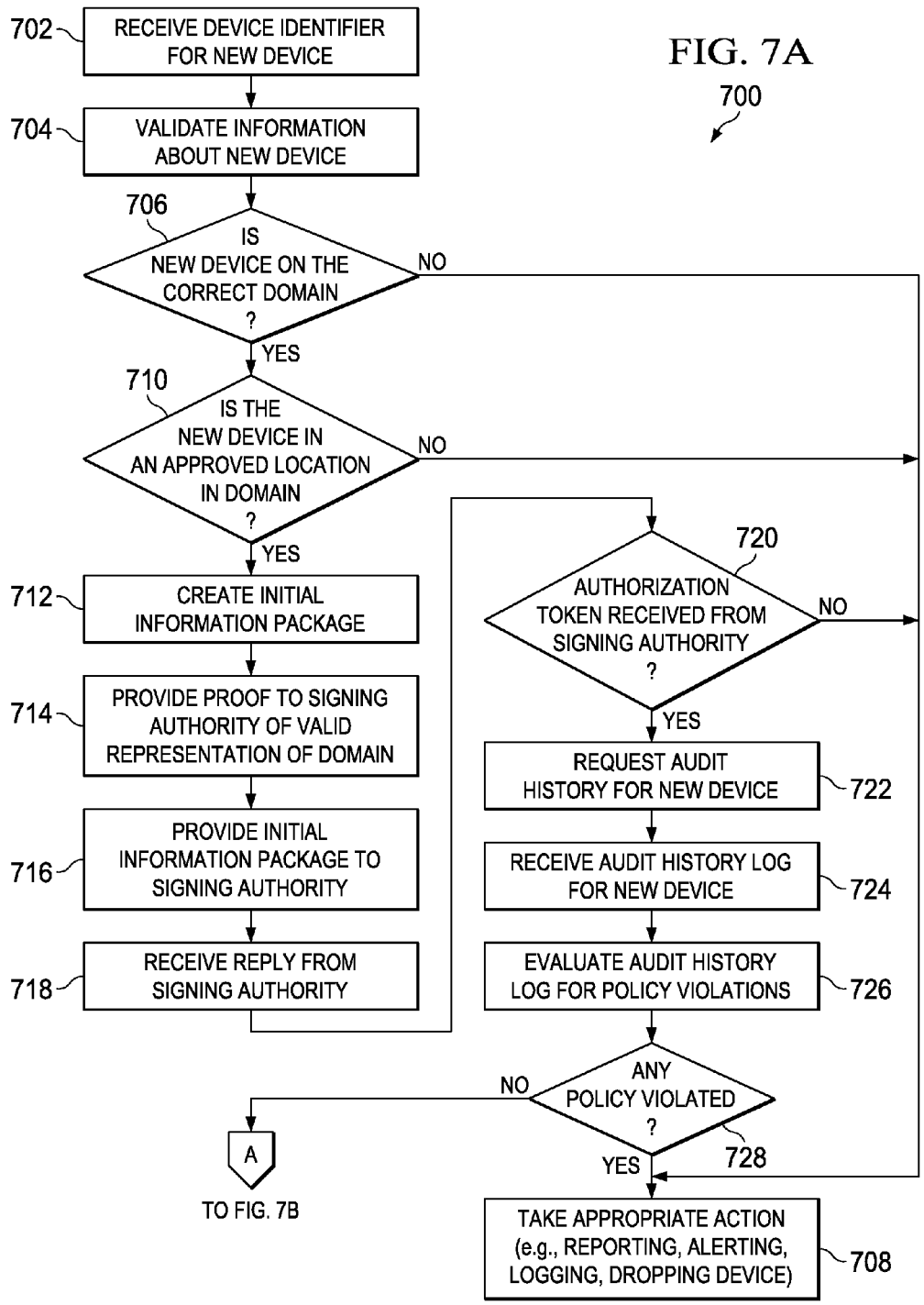

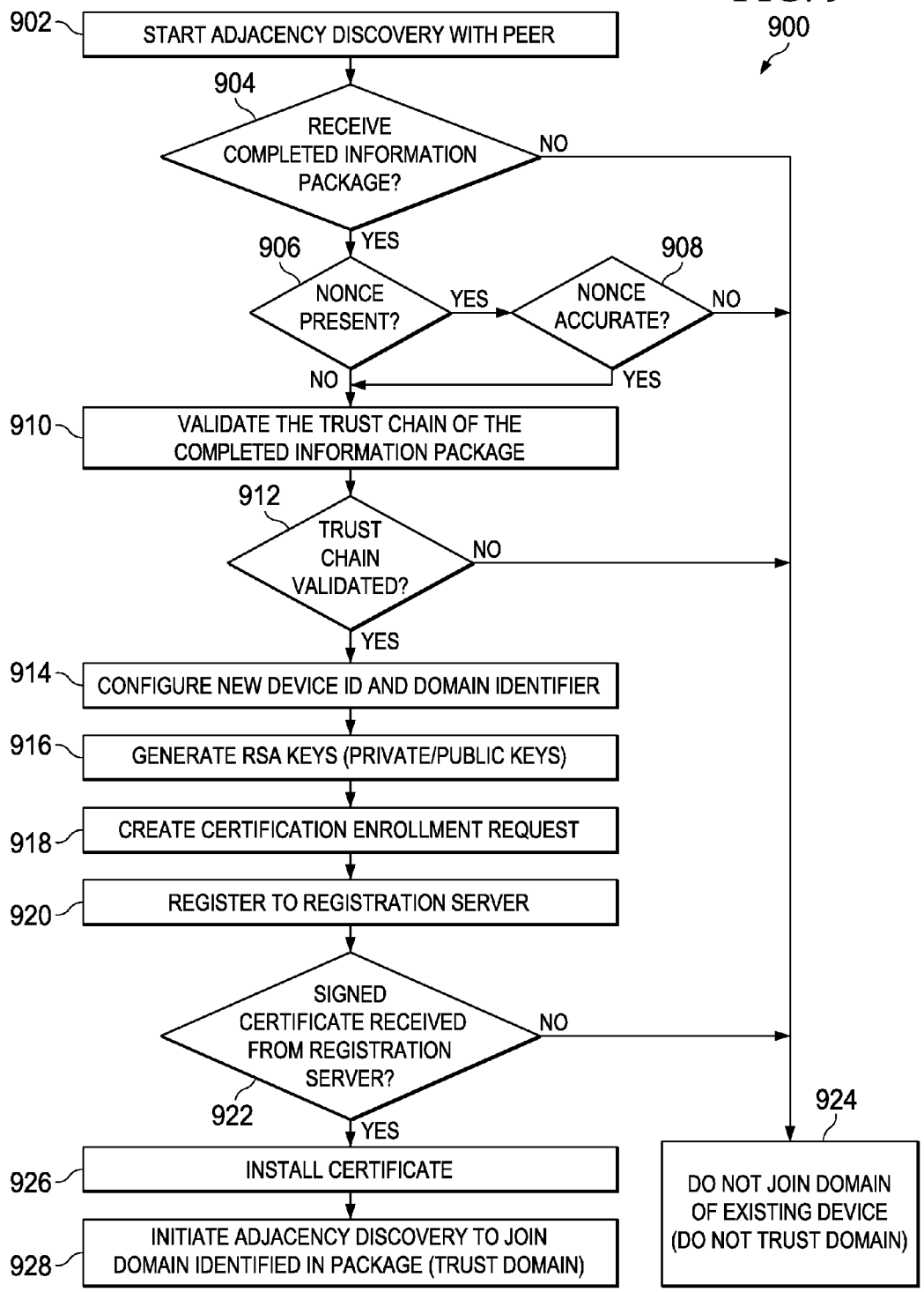

SYSTEM AND METHOD FOR ENABLING UNCONFIGURED DEVICES TO JOIN AN AUTONOMIC NETWORK IN A SECURE MANNER

RELATED U.S. APPLICATION INFORMATION

This application is related to co-pending U.S. patent application Ser. No. 13/477,913, filed May 22, 2012, entitled "USING NEIGHBOR DISCOVERY TO CREATE TRUST INFORMATION FOR OTHER APPLICATIONS," by inventors Steinthor Bjarnason, et al., which is considered part of this application and is incorporated by reference herein in its entirety.

TECHNICAL FIELD

This disclosure relates in general to the field of computer networks and, more particularly, to a system and method for enabling unconfigured devices to join an autonomic network in a secure manner.

BACKGROUND

Computers and computer networking have become an integral part of daily life in today's society. Most organizations rely on computer networks to enable sharing resources and information to advance the purposes of the organization. A typical computer network of an organization can include computing devices such as laptops, personal computers, smartphones (i.e., cell phones offering advanced computing capabilities), personal digital assistants (PDAs), etc., and network elements such as routers, switches, gateways, servers, etc. Additionally, any number of computing devices and network elements can be configured in a particular computer network, with some computer networks having hundreds of thousands of such devices. Moreover, as an organization grows and/or changes, its computer networking needs may also change. Hence, adding network elements and computing devices to a computer network can be a common occurrence. Although many devices have autonomic or self-managing properties, configuring new devices in a secure manner can nevertheless be an administrative burden. Thus, the ability to effectively manage computer networks presents significant challenges for network administrators. Accordingly, a simplified approach for enabling secure configuration of new devices is needed.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 4 is a simplified interaction diagram illustrating potential operations that may be associated with an example embodiment of the system of FIG. 1;

FIG. 5 is a table of example messages and potential message contents that may be associated with operations of embodiments of the system of FIG. 1;

FIG. 6 is a simplified interaction diagram illustrating potential operations that may be associated with another example embodiment of the system of FIG. 1;

FIG. 9 is a simplified flow chart illustrating additional example operational steps that may be associated with a new autonomic device in example embodiments of the system.

DESCRIPTION OF EXAMPLE EMBODIMENTS

Overview

A method is provided in one example and includes creating an initial information package for a device in a domain of a network environment when the device is unconfigured. The method also includes communicating the initial information package to a signing authority, receiving an authorization token from the signing authority, and sending the authorization token to the unconfigured device. The unconfigured device validates the authorization token based on a credential in the unconfigured device. In more specific embodiments, the initial information package includes a unique device identifier of the unconfigured device and a domain identifier of the domain. In further embodiments, the signing authority creates the authorization token by applying an authorization signature to the unique device identifier and the domain identifier. In particular embodiments, the unconfigured device validates the authorization token by verifying the authorization token was created by the signing authority and verifying the signing authority is trusted based on the credential.

In additional embodiments, the method includes receiving an audit history report of the unconfigured device and applying a policy to the unconfigured device based on the audit history report. In more specific embodiments, the policy prevents the unconfigured device from joining the domain if the audit report indicates that the unconfigured device was previously registered to a different domain in the network environment.

Example Embodiments

Figure 1:
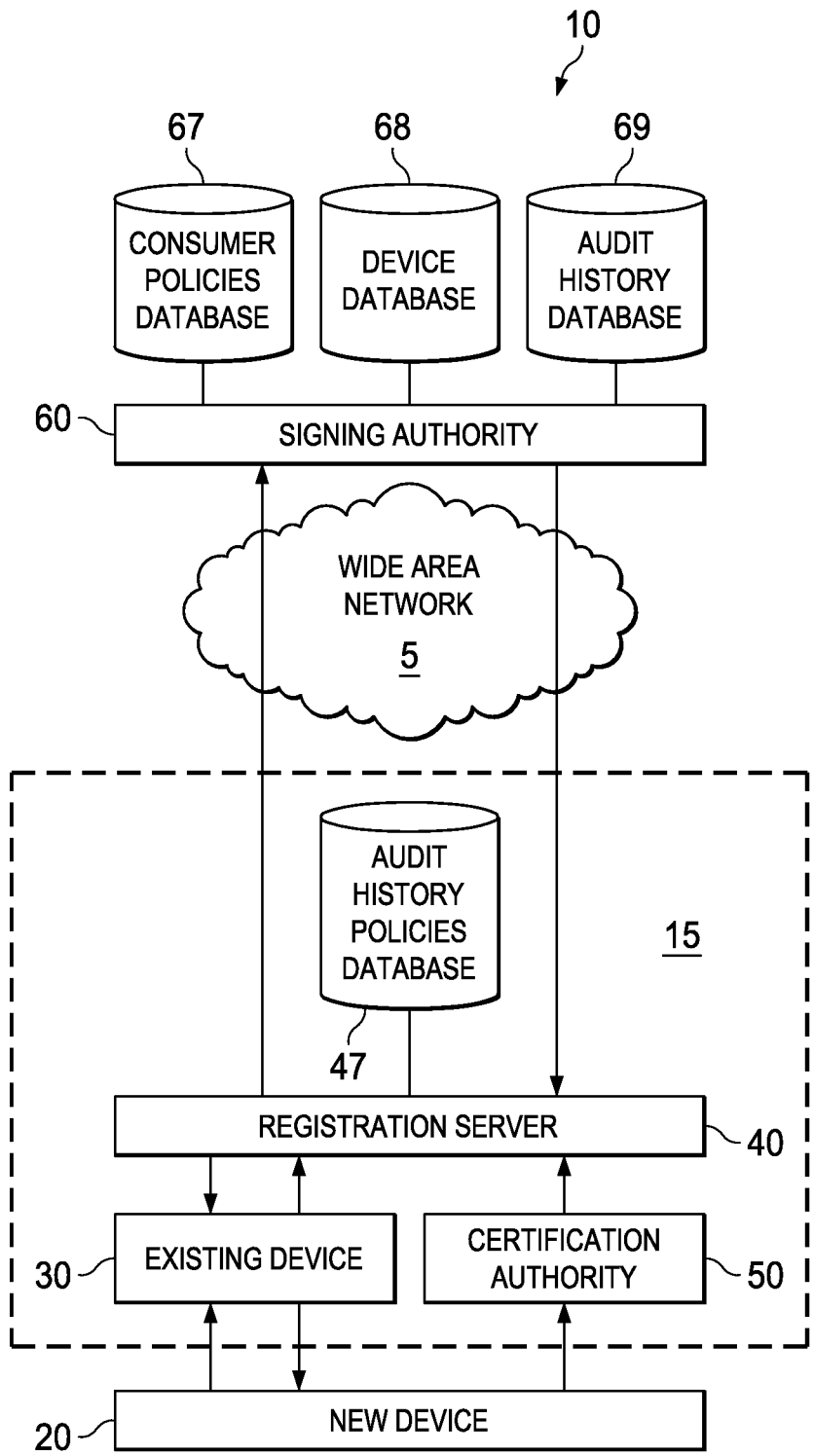
FIG. 1 is a simplified block diagram of an example network environment in which a system for enabling unconfigured devices to join autonomic networks in a secure manner can be implemented in accordance with embodiments of the present disclosure.

FIG. 1 is a simplified block diagram of a network environment 10 in which a system for enabling unconfigured devices to join an autonomic network in a secure manner can be implemented. In network environment 10, an exemplary autonomic network domain 15 is illustrated and includes autonomic elements such as an existing device 30 and a registration server 40. An audit history policies database 47 may be provided with policies related to the audit histories of autonomic devices that attempt to join domain 15. A certification authority 50 may also be provided in domain 15. In addition, domain 15 could also include a wide variety of other computing devices such as desktops, laptops, smart phones (i.e., cellular phones with computing capabilities), personal digital assistants (PDAs), tablets, etc., and network elements such as routers, gateways, firewalls, switches, servers, etc. A new device 20, which is autonomic and initially unconfigured, can be introduced to domain 15 and can communicate with registration server 40, either directly or via existing device 30.

Registration server 40 may be configured to communicate to other networks and cloud services via wide area network 5 (e.g., the Internet). A signing authority 60 may be provided as a cloud service in wide area network 5, and may be administered by a manufacturer of autonomic devices such as new device 20. Alternatively, signing authority 60 may be provided locally as part of autonomic network 15. A customer policies database 67 may be provided to allow customers (i.e., entities who acquire or otherwise control autonomic devices of the manufacturer) to request policies to be dynamically applied to their autonomic devices and/or domains. A device database 68 may be provided to include identifications of autonomic devices of a manufacturer and possibly identifications of domains to which they belong. An audit history database 69 may be provided to include audit histories of the autonomic devices. Databases 67-69 can be implemented locally or remotely to signing authority 60.

In example embodiments, a system and method for enabling unconfigured devices to securely join an autonomic network domain may be implemented in network environment 10 by providing registration server 40 and a locally or remotely implemented signing authority 60. Registration server 40 creates an initial basic registration information package (hereinafter 'initial information package') identifying the domain and the new device that is attempting to join the domain. Registration server 40 communicates the initial information package to signing authority 60. Signing authority 60 can validate the new device and create an authorization token that links the new device with the domain, and signals the new device that it is permitted to join the domain. Registration server 40 can verify the audit history of the new device and create a completed information package that includes the authorization token. The completed information package is sent to the new device, which can then validate and accept the completed information package, and use the information in the completed information package to join the autonomic network domain.

Certain terminologies are used herein with regard to the various embodiments of the present disclosure. The term 'information' as used herein, refers to any type of binary, numeric, or textual data, or any other suitable data in any appropriate format that may be communicated from one point to another in electronic devices (e.g., computing devices, network elements) and/or networks.

For purposes of illustrating the operational aspects of a system for enabling unconfigured devices to securely join an autonomic network, it is important to understand the communications that may be traversing network environment 10 and the problems that may be present in operational scenarios occurring in network environment 10. The following foundational information may be viewed as a basis from which the present disclosure may be properly explained. Such information is offered for purposes of explanation only and, accordingly, should not be construed in any way to limit the broad scope of the present disclosure and its potential applications.

A new, unconfigured device typically needs some manual configuration to enable the new device to join an autonomic network infrastructure. This configuration may be performed by a network administrator or may be performed by a manufacturer of the new device if requested by a customer. Configuration settings can include, for example, a network name (e.g., domain name of the network), a domain-specific device identifier, and other settings such as available encryption types, usernames and passwords, web addresses, etc.

Although manual configuration is generally more secure than automatic configuration, manual configuration can impose a significant administrative burden on network administrators. Furthermore, even a partially manual configuration process may be undesirable in large entities or in entities with minimal network administrative support. For example, manual configuration of security mechanisms (e.g., authentication credentials such as passwords) alone is often considered unduly burdensome.

Existing provisioning schemes for autonomic devices do not provide automatic configuration with security mechanisms in both communication directions, which include communications from a new device attempting to join an untrusted network, and communications from the untrusted network to the new device providing independent authentication of the network. In some existing schemes, device provisioning may be accomplished by allowing a new device to assume that every device to which the new device can connect is part of a secure network. Another mechanism sometimes used in wireless networks allows a network connection to be established between a new device and a peer in any domain within a wireless network range, as long as the new device and the peer are associated with the same manufacturer. Yet another mechanism allows a new device to be configured automatically whenever the new device is physically connected to an existing device in the network. These processes generally lack security mechanisms and depend on physical proximity of the new device and the network infrastructure.

Some so-called automatic device provisioning solutions allow new devices to communicate with a trusted party in order to be authenticated to a computer network. In these solutions, however, a new device itself may actually establish contact with the trusted party. In addition, if trusted elements are widely distributed in an autonomic network to facilitate automatic provisioning, security may be reduced. What is needed is a system that allows new devices to communicate with untrusted network services, rather than trusted network services, and to establish trust based on independently secured tokens, in both directions of communication.

A system for enabling unconfigured devices to join an autonomic network in an automated and secure manner, as shown in FIG. 1, can resolve many of these issues. FIG. 1 illustrates one embodiment in which a new device securely authenticates a network infrastructure without imposing manual configuration or unsecure infrastructure assumptions. In the system of FIG. 1, the autonomic network domain authenticates the new device, and the new device authenticates the autonomic network domain by leveraging credentials in the new device (e.g., a unique device identifier (UDI) and a manufacturer's root public key), and a trusted signing authority (e.g., a manufacturer of the new device) to create a secure trust-chain. More particularly, a new device can verify that its attempt to join an untrusted domain is audited by the trusted signing authority. The new device verifies that its actions are audited and authorized by the signing authority (e.g., by verifying its signature on an authorization token) and by verifying the signing authority itself is trusted, without actually communicating with the signing authority. In addition, the new domain can verify that previous audit entries related to the new device are acceptable according to domain policy. In particular, policy decisions and audit log decisions can be performed by a registration server of the untrusted domain. Thus, it is acceptable for the signing authority to authorize "insecure" actions such as new devices joining unknown domains so long as such actions are properly audited. Furthermore, in some scenarios, customer policies can be implemented on a per device and/or per domain basis by the signing authority. Accordingly, a flexible system is provided in which a new device that is 'out of the box' with no initial configuration can automatically join an autonomic network in a zero-touch, secure manner. Additionally, the system's flexibility enables the customer to dynamically control and manage desired policies through a registration server and potentially, through the signing authority.

Turning to the infrastructure of FIG. 1, network environment 10 represents a series of points or nodes of interconnected communication paths for receiving and transmitting packets of information that propagate through the system. Nodes of FIG. 1 may be coupled to one another through one or more interfaces employing any suitable connection (wired or wireless), which provides a viable pathway for electronic communications. Network environment 10 can include any local area network (LAN), wireless local area network (WLAN), metropolitan area network (MAN), Intranet, Extranet, wide area network (e.g., WAN 5), virtual local area network (VLAN), virtual private network (VPN), or any other appropriate architecture or system that facilitates communications in a network environment.

Network environment 10 may include a configuration capable of transmission control protocol/Internet protocol (TCP/IP) communications for the transmission or reception of packets in a network. Network environment 10 may also operate in conjunction with a user datagram protocol/IP (UDP/IP) or any other suitable protocol where appropriate and based on particular needs. Additionally, any one or more of the nodes in FIG. 1 may be combined or removed from the architecture based on particular configuration needs.

In one example embodiment, domain 15 can be configured in any suitable form (e.g., an Intranet or Extranet, a local area network (LAN), wide area network (WAN), wireless local area network (WLAN), virtual local area network (VLAN), etc.) using private address space. A 'domain' as used herein, refers to an autonomic network (or a portion thereof) in which nodes, such as network elements and other computing devices, can be authenticated and registered or enrolled by a security element (e.g., registration server 40) and within which the configured and authenticated nodes can communicate. An 'autonomic network' refers to a computer network in which nodes interact autonomously with each other and based on those interactions can form an end to end network without requiring human intervention in a secure manner. The nodes in the network are capable of interpreting network wide instructions and can aggregate network wide information before handing it over to a network management entity.

In particular, domain 15 represents an autonomic network (or a portion thereof) in which registration server 40, existing device 30, and certification authority 50 are configured and authenticated. New device 20 represents an unconfigured machine within a connectivity range of a configured and authenticated machine within autonomic network domain 15, such as existing device 30. The connectivity range could include a wireless connectivity range when new device 20 and existing device 30 are both configured with wireless connection capabilities such as network interface controllers (WNICs). In other scenarios, the unconfigured new device 20 could be directly connected (e.g., via Ethernet, token ring, etc.) to existing device 30.

Domain 15 may be connected, through appropriate network elements (e.g., routers, bridges, switches, gateways, firewalls, etc.), to another private network, a public network (e.g., WAN 5), or a combination of public and private networks. In one example embodiment, registration server 40 can communicate with signing authority 60 through the Internet (e.g., WAN 5). In this embodiment, network domain 15 may be connected to the Internet by any appropriate medium including, for example, digital subscriber lines (DSL), telephone lines, T1 lines, T3 lines, wireless, satellite, fiber optics, cable, Ethernet, etc. or any combination thereof. Alternatively, domain 15 and signing authority 60 may not be connected by a network and could communicate via manual methods.

Typically, a domain and its nodes are associated with a customer or entity (e.g., business enterprise, government organization, nonprofit organization, educational organization, etc.). A customer or entity can be associated with a domain if it owns, controls, or otherwise legitimately exercises authority over and/or makes decisions regarding the domain. Customers or entities may buy, lease, license, or otherwise acquire autonomic devices from a manufacturer, in accordance with this specification. As used herein, 'customer' may be used interchangeably with 'entity.'

It should be understood that while an example network 10 has been shown and described herein, the system and method of the present disclosure may be implemented in any network environment capable of supporting the architecture. Accordingly, the description with reference to network environment 10 should be not be construed to imply architectural limitations, but rather, should be construed as illustrative.

Figure 2:
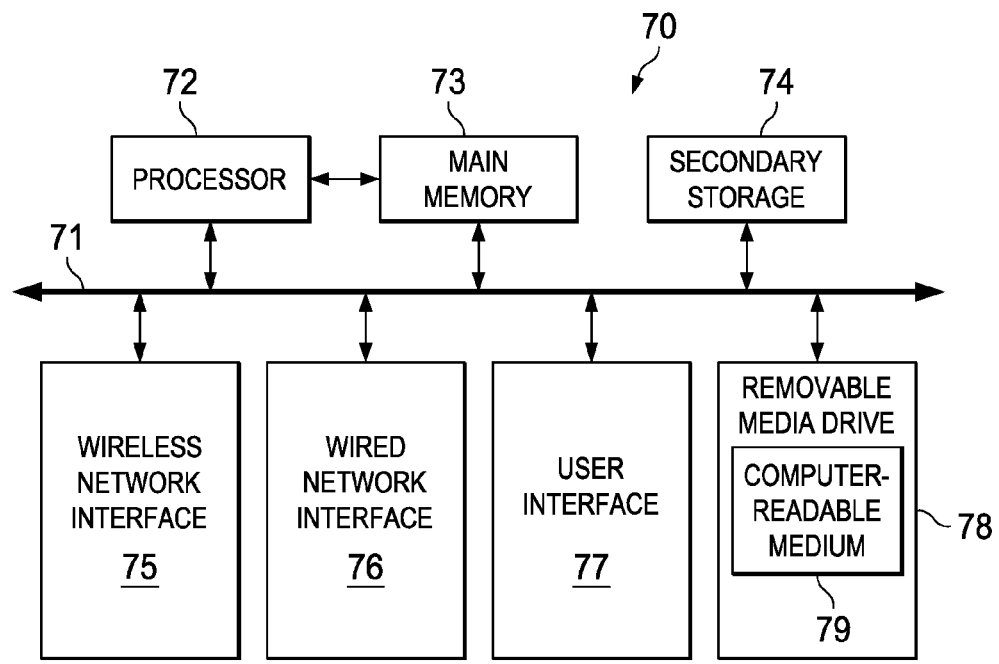
FIG. 2 is a simplified block diagram showing components of an example machine capable of executing instructions in a processor.

Turning to FIG. 2, FIG. 2 is a simplified block diagram of an example machine (or apparatus) 70, such as a general or special purpose computer that may be implemented in network environment 10 according to the present disclosure. The example machine 70 corresponds to network elements and computing devices that may be deployed in network environment 10 including, for example, new device 20, existing device 30, registration server 40, signing authority 60, and certification authority 50. In particular, FIG. 2 illustrates a block diagram representation of an example form of a machine within which software and hardware cause machine 70 to perform any one or more of the activities or operations discussed herein. As shown in FIG. 2, machine 70 may include a processor 72, a main memory 73, secondary storage 74, a wireless network interface 75, a wired network interface 76, a user interface 77, and a removable media drive 78 including a computer-readable medium 79. A bus 71, such as a system bus and a memory bus, may provide electronic communication between processor 72 and the memory, drives, interfaces, and other components of machine 70.

Processor 72, which may also be referred to as a central processing unit (CPU), can include any general or special-purpose processor capable of executing machine readable instructions and performing operations on data as instructed by the machine readable instructions. Main memory 73 may be directly accessible to processor 72 for accessing machine instructions and may be in the form of random access memory (RAM) or any type of dynamic storage (e.g., dynamic random access memory (DRAM)). Secondary storage 74 can be any non-volatile memory such as a hard disk, which is capable of storing electronic data including executable software files. Externally stored electronic data may be provided to computer 70 through one or more removable media drives 78, which may be configured to receive any type of external media such as compact discs (CDs), digital video discs (DVDs), flash drives, external hard drives, etc.

Wireless and wired network interfaces 75 and 76 can be provided to enable electronic communication between machine 70 and other machines (e.g., new device 20, existing device 30, registration server 40, signing authority 60, certification authority 50) via networks (e.g., domain 15, wide area network 5). In one example, wireless network interface 75 could include a wireless network controller (WNIC) with suitable transmitting and receiving components, such as transceivers, for wirelessly communicating within a network. Wired network interface 76 can enable machine 70 to physically connect to a network by a wire line such as an Ethernet cable. Both wireless and wired network interfaces 75 and 76 may be configured to facilitate communications using suitable communication protocols such as, for example, Internet Protocol Suite (TCP/IP). Machine 70 is shown with both wireless and wired network interfaces 75 and 76 for illustrative purposes only. While one or more wireless and hardwire interfaces may be provided in machine 70, or externally connected to machine 70, only one connection option is needed to enable connection of machine 70 to a network.

A user interface 77 may be provided in some machines to allow a user to interact with the machine 70. User interface 77 could include a display device such as a graphical display device (e.g., plasma display panel (PDP), a liquid crystal display (LCD), a cathode ray tube (CRT), etc.). In addition, any appropriate input mechanism may also be included such as a keyboard, a touch screen, a mouse, a trackball, voice recognition, touch pad, etc.

Removable media drive 78 represents a drive configured to receive any type of external computer-readable media (e.g., computer-readable medium 79). Instructions embodying the activities or functions described herein may be stored on one or more external computer-readable media. Additionally, such instructions may also, or alternatively, reside at least partially within a memory element (e.g., in main memory 73 or cache memory of processor 72) of machine 70 during execution, or within a non-volatile memory element (e.g., secondary storage 74) of machine 70. Accordingly, other memory elements of machine 70 also constitute computer-readable media. Thus, 'computer-readable medium' is meant to include any medium that is capable of storing instructions for execution by machine 70 that cause the machine to perform any one or more of the activities disclosed herein.

Not shown in FIG. 2 is additional hardware that may be suitably coupled to processor 72 and other components in the form of memory management units (MMU), additional symmetric multiprocessing (SMP) elements, physical memory, peripheral component interconnect (PCI) bus and corresponding bridges, small computer system interface (SCSI)/integrated drive electronics (IDE) elements, etc. Machine 70 may include any additional suitable hardware, software, components, modules, interfaces, or objects that facilitate the operations thereof. This may be inclusive of appropriate algorithms and communication protocols that allow for the effective protection and communication of data. Furthermore, any suitable operating system may also be configured in machine 70 to appropriately manage the operation of the hardware components therein.

The elements, shown and/or described with reference to machine 70, are intended for illustrative purposes and are not meant to imply architectural limitations of machines such as those utilized in accordance with the present disclosure. In addition, each machine, including new device 20, existing device 30, registration server 40, signing authority 60, and certification authority 50, may include more or less components where appropriate and based on particular needs. As used herein in this Specification, the term 'machine' is meant to encompass any computing device or network element such as servers, routers, personal computers, client computers, network appliances, switches, bridges, gateways, processors, load balancers, wireless LAN controllers, firewalls, or any other suitable device, component, element, or object operable to affect or process electronic information in a network environment.

Figure 3:
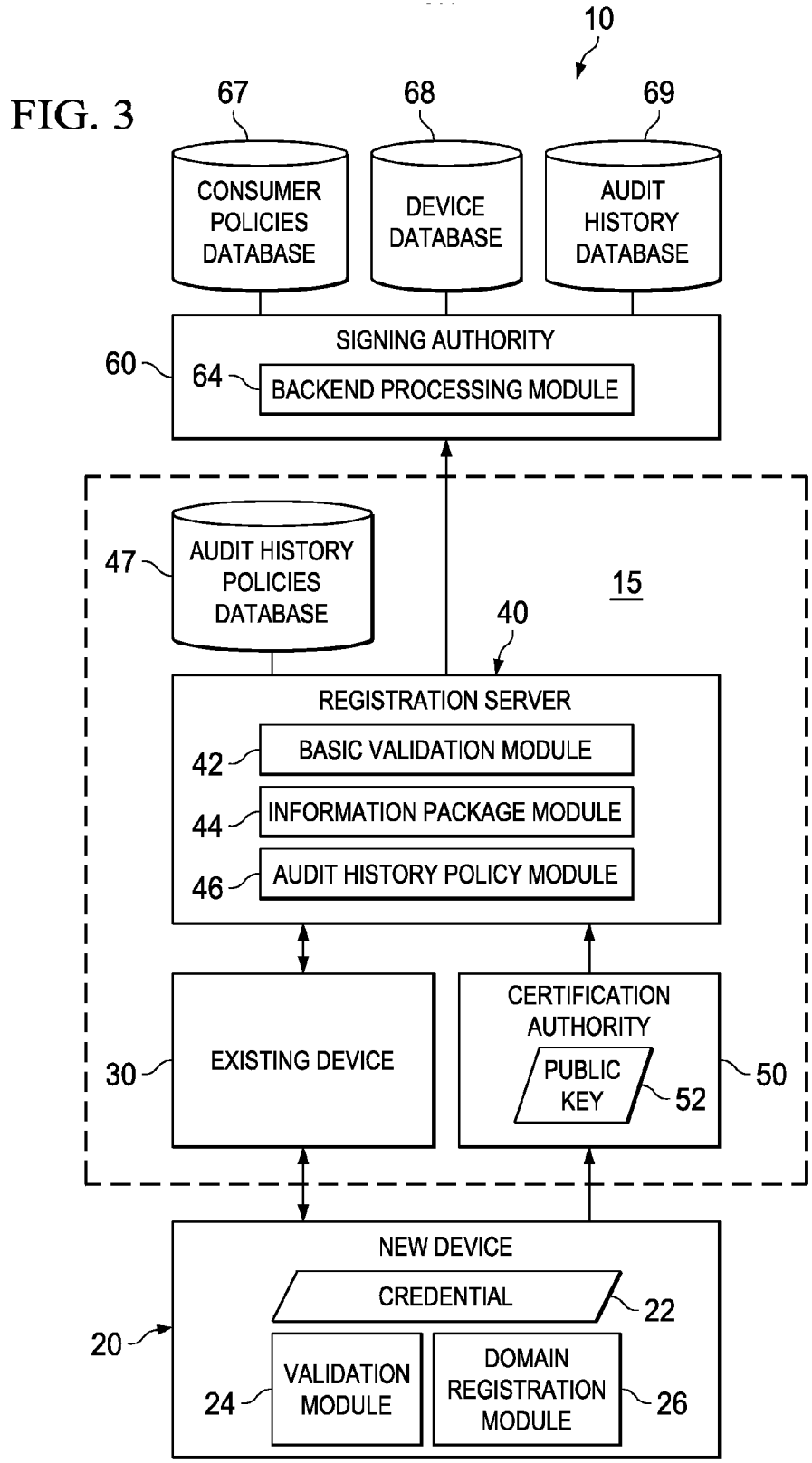
FIG. 3 is a simplified block diagram showing additional details of example components configured to implement the system of FIG. 1.

Turning to FIG. 3, FIG. 3 is a simplified block diagram illustrating one possible set of details associated with the system implemented in network environment 10. New device 20 may be an 'out of the box' machine with only factory default settings. For example, an unconfigured new device may have no information about its domain identity or a network domain to which it belongs. However, new device 20 may have an electronically stored credential 22 (e.g., manufacturing installed certificate) to provide a level of trust between the device and a manufacturing service that may be provided by the manufacturer of device. The credential enables new device 20 to trust the manufacturer service and vice-versa. A credential is a data object that provides authentication information about a device, network, object, entity, person, etc. A public key with identity fields is one example of a credential and a public key infrastructure (PKI) is one possible instantiation of how trust between a manufacturer service and a new device can be achieved. In PKI, a public key is part of a key-pair (public and private keys) in which each half of the pair is a parameter that determines the operation of a cryptographic algorithm to decrypt information encrypted by its corresponding key (the other half of the pair) and another cryptographic algorithm. As used herein, 'signing' data, 'generating a signature,' or 'applying a signature' refers to using a key (e.g., a private key), which may be based on a hash value generated from a hashing algorithm, and a signing algorithm to create a signature that can be decrypted by a corresponding key (e.g., a public key) and a signature verifying algorithm. Signing and decrypting can also be accomplished in reverse, using a public key for signing and a corresponding private key for decrypting.

One potential instantiation of a manufacturing installed certificate in new device 20 is an Institute of Electrical and Electronics Engineers (IEEE) 801.1AR initial device identifier (IDevID), which is described in "IEEE Standard for Local and Metropolitan Area Networks—Secure Device Identity," IEEE Computer Society, approved Dec. 9, 2009. A manufacturing installed certificate can include a secure unique device identifier (secure UDI or 'SUDI'). A UDI can include a product identifier (PID), a version identifier (VID), and/or a serial number (SN) of the new device. Either a secure UDI or an unsecured UDI may be supported. As used herein, 'device identifier' refers to a secured and unsecured UDI, unless otherwise indicated. The manufacturing installed certificate, such as an IEEE 802.1AR IDevID, can also include a root public key of the manufacturer. The root public key can be used to determine whether signing authority 60 is trusted.

Alternatively, some embodiments can support a customer-installed credential. In such an embodiment, a customer may decide to add its own root credential to a new device, such that the new device has an additional client device credential. This additional credential may be provided to allow the new device to trust an alternate signing authority instead of, or in addition to, signing authority 60. Accordingly, the alternate signing authority could be owned by the customer or a third party and could provide similar functionalities as a manufacturer-controlled signing authority 60.

New device 20 may also include a validation module 24 and a domain registration module 26. Validation module 24 can verify and accept a completed information package from registration server 40 and domain registration module 26 can use data in the completed information package to join domain 15. In particular, validation module 24 can validate information in the package by validating authorization provided by the package. Domain registration module 26 can configure a new domain-specific device identifier and domain for new device 20, and create a certificate request to join domain 15. In some implementations, RSA public and private key pairs may also be generated.

In some embodiments, new device 20 may connect to an existing device (e.g., existing device 30), in the network topology of domain 15. Existing device 30 can be a neighboring or adjacent machine (e.g., a router, switch, gateway, host, etc.) that supports the discovery protocols of domain 15. In accordance with embodiments disclosed herein, existing device 30 can facilitate provisional network traffic for new devices not yet enrolled in the trusted domain 15. Essentially, existing device 30 can act as a proxy for transactions between new device 20 and registration server 40, and may provide some information regarding the physical location of new device 20. Accordingly, new device 20 might not communicate directly with registration server 40 until the new device has registered with domain 15. Furthermore, the network topology of domain 15 may vary depending on the capabilities of the discovery protocol and thus, existing device 30 could potentially be geographically or topologically remote from new device 20. In other embodiments, new device 20 may initiate communication directly with registration server 40 and bypass any existing devices as proxies.

Embodiments disclosed herein allow for any suitable adjacency discovery protocol to be used to enable communication between new device 20 and existing device 30. A device can use adjacency discovery to discover adjacent neighbors (or peers) on each layer on which the device is capable. Existing devices in the same autonomic domain may be considered 'trusted' and existing devices in different autonomic domains may be considered 'untrusted'. 'Trusted' neighbors can send control plane traffic to domain 15. Other traffic can be forwarded through the network and is limited to the data plane. When an 'untrusted' neighbor needs to send traffic to domain 15 (e.g., routing protocols), exceptions may be made to allow those 'untrusted' devices access.

An autonomic adjacency discovery protocol can enable a device to discover 'trusted' neighbors on all layers and on all active interfaces. In addition, adjacency discovery may be performed on all layers in parallel (e.g., layer 2 and layer 3 in parallel). 'Trusted' neighbors can be identified on each layer and secure communication paths for Control plane/Management plane traffic can be created between the 'trusted' peers. One possible autonomic adjacency discovery protocol, which can be implemented in embodiments disclosed herein, is described in co-pending U.S. patent application Ser. No. 13/477,913, entitled "Using Neighbor Discovery to Create Trust Information for Other Applications," filed May 22, 2012, by inventors Steinthor Bjarnason, et al., which was previously incorporated herein by reference in its entirety.

In an example autonomic adjacency discovery protocol, new device 20 announces its secure UDI (e.g., IEEE 802.1AR IDevID credential), via an adjacency discovery message, to any other connected devices. If new device 20 does not contain a manufacturer's IEEE 802.1AR credentials (or other SUDI), it can use an unsecured UDI or even manually distributed authentication data. Since new device 20 is not yet a member of a domain, however, its domain certificate (e.g., IEEE 802.1AR LDevID) can be blank. Thus, new device 20 is an 'untrusted' device and existing device 30 can use an access control list (ACL) or set a corresponding interface into a data virtual local area network (VLAN) to act as a proxy for transactions between new device 20 and registration server 40. Alternatively, new device 20 could initiate adjacency discovery directly with registration server 40, without an intermediate device acting as a proxy.

Another example of an autonomic adjacency discovery protocol combines the characteristics of existing multicast and single-hop protocols (e.g., IPV6 Neighbor Discovery, Cisco Discovery Protocol (CDP), Link Layer Discovery Protocol Media Endpoint Devices (LLDP-MED), Bonjour, Universal Plug and Play (UPnP), Service Advertisement Framework (SAF), etc.). In this example discovery protocol, a first node (e.g., new device 20) sends a multicast discovery message including its domain identifier, which may be null for an unconfigured device. Additionally, the multicast discovery message may contain new device 20's secure UDI (e.g., IEEE 802.1AR IDevID credential). The first node also sends a single-hop discovery message to one or more single-hop neighbors. The single hop discovery message may also comprise the domain identifier (e.g., null for an unconfigured device) and secure UDI of the first node. In each of the multicast and single-hop protocols, a list is built including a list of trusted neighbors and of untrusted neighbors based on the domain identifier provided in the particular discovery message. Multiple neighbor discovery messages may be received and at least one of the network nodes may be identified. For an 'untrusted' neighbor that presents a SUDI in the discovery message, the receiving device can act as a proxy for transactions between the 'untrusted' neighbor and registration server 40.

Registration server 40 is a machine responsible for obtaining secured (e.g., signed) authorization tokens from signing authority 60 and applying policies to unconfigured devices attempting to join domain 15. Specifically, registration server 40 can validate whether unconfigured new device 20 is allowed to connect to domain 15 based on domain local information and whether policies allow new device 20 to connect to domain 15 based on an audit history of new device 20. Registration server 40 can also provide new device 20 with authorization information to enable new device 20 to decide whether to join domain 15. In one example configuration, registration server 40 can include a basic validation module 42, an information package module 44, and an audit history policy module 46. In addition, audit history policies database 47 could be integrated with registration server 40 or could be an external storage repository accessible to registration server 40.

Registration server 40 interacts with signing authority 60 to obtain an authorization token for a new, unconfigured device to join domain 15, or to receive another response indicating that the unconfigured device is not authorized to join domain 15. In one embodiment, an authorization token includes a device identifier of new device 20 and a domain identifier of domain 15, and is signed by signing authority 60. In another embodiment, registration server 40 could receive a certificate issued by the manufacturer (e.g., signed by signing authority 60) to enable registration server 40 to bind together domain and device identifiers for new devices and sign the information itself. Although registration server 40 itself is not trusted, in this embodiment, the signed certificate from signing authority 60 enables new device 20 to verify that signed information from registration server 40 is representative of the manufacturer and, therefore, trusted. In another embodiment, registration server 40 could be administered by the manufacturer, and thus, provide the trusted signatures for new device 20. In yet another embodiment, signing authority 60 could be separately deployed in domain 15 and could communicate with registration server 40 within domain 15 (e.g., without traversing the Internet). Furthermore, registration server 40 may be provided by distributed elements of the network infrastructure and may not be a discrete device/service. In these various embodiments, new device 20 can securely and automatically connect to domain 15 without itself needing to connect to the cloud.

Basic validation module 42 of registration server 40 can determine whether new device 20 should be allowed to join domain 15, based on the device identifier (e.g., SUDI or UDI) received from new device 20. If the new device 20 is validated as a legitimate device to join domain 15, then information package module 44 can generate an initial information package. This initial information package, including the device identifier and a domain identifier of domain 15, can be communicated to signing authority 60 to request authorization for new device 20 to join domain 15. Furthermore, in some implementations and particular scenarios, the initial information package could be configured to contain a list of device identifiers corresponding to multiple unconfigured new devices, for which authorization to join domain 15 is being requested.

When registration server 40 receives an authorization token and audit logs from signing authority 60 for new device 20, audit history policy module 46 can evaluate the audit history of new device 20 for policy violations. Provided that the history and policies (if any) do not prohibit new device 20 from joining the network, information package module 44 can generate and communicate a completed information package to new device 20, via existing device 30. Registration server 40 can then allow new device 20 to register to domain 15 if new device 20 provides appropriate and secure credentials.

Signing authority 60 can be implemented in a machine and can include a backend processing module 64. In addition, customer policies database 67, device database 68, and audit history database 69 could be integrated with signing authority 60 or could be configured as one or more external storage repositories accessible to signing authority 60. Signing authority can be provided, in some embodiments, as a cloud resource by a manufacturer of unconfigured autonomic devices. A cloud resource could be accessed by registration server 40 through wide area network 5 (e.g., the Internet). As previously mentioned, however, the signing authority service could be provided in a separate component (e.g., a server) in domain 15, or potentially integrated with registration server 40 in domain 15. In an embodiment in which signing authority 60 is implemented locally (e.g., in domain 15) and not owned by the manufacturer, then credential 22 of new device 20 may not have the manufacturing root public key. Instead, the manufacturer may issue some other credential to the local signing authority that new device 20 can verify and recognize as representative of its manufacturer.

Signing authority 60 can offer a service of providing authorization tokens for unconfigured autonomic devices or to issue domain specific certificates to registration server 40. Signing authority 60 can also provide audit functionalities for unconfigured autonomic devices, where audit logs of each device registration and device registration attempt are stored in audit history database 69. Audit functionalities may be leveraged by business relationships with customers (e.g., by allowing customers to request policies to be dynamically applied to their devices). Signing authority 60 can be configured to make various decisions regarding security level (e.g., existence of a nonce in an initial information package) and may, for example, leverage information from various databases such as a theft database that provides information concerning stolen devices from autonomic networks, or device database 68 that correlates autonomic devices and domains to which they belong. The autonomic devices indicated in device database 68 may not necessarily be authenticated members of the domains to which they are correlated, for example, recently acquired, unconfigured devices that have not yet been deployed. Additional services of signing authority 60 may include accounting responsibilities, which may reference bill-of-sale information.

Backend processing module 64 of signing authority 60 can be configured to receive and process requests from registration server 40 to determine whether a new device is authorized to connect to domain 15. In some embodiments, backend processing module 64 may simply verify that registration server 40 is a valid representative of domain 15 and, if so, issue an authorization token that authorizes new device 20 to join domain 15. The authorization token can be configured using any suitable trust or security protocol with mechanisms that enable new device 20 to validate a message providing authorization to join a particular domain. In one example embodiment, the authorization token can be configured using public key infrastructure (PKI) or equivalent.

In other embodiments, backend processing module 64 may validate whether new device 20 belongs to an entity associated with domain 15. In this embodiment, device database 68 could be configured with valid UDIs (secure or unsecured), mapped to entities (e.g., by domain identifiers) that own or otherwise control the devices represented by the particular UDIs. In one scenario, the sales process of the manufacturer associated with signing authority 60 could be configured to provide updates to device database 68 when new autonomic devices are sold, and could provide UDIs of the devices sold and identifications of their corresponding customers/domains. If a UDI found in device database 68 matches a UDI provided in an initial information package, then signing authority 60 may generate a signed authorization token if the corresponding domain identifier in device database 68 matches the domain identifier provided in the initial information package. Signing authority 60 can sign the authorization token using the signing authority's own private key based on a key pair rooted in the manufacturer's chain of trust. This signature can be validated by new device 20, using its credential 22.

Backend processing module 64 can also be configured to provide audit functionalities to customers. For example, a device's history can be recorded in audit history database 69. In particular, a domain identifier and corresponding device identifier can be recorded in audit history database 69 each time signing authority 60 receives an authorization request (e.g., via an initial information package) or other transaction request for the domain identifier and corresponding device identifier. In addition, the various transactions requested (e.g., requests from any registration server for authorization to join a domain, requests from any registration server for audit history, etc.) could be recorded in audit history database 69. Thus, audit history database 69 could be used to track all issued and denied authorizations and to apply appropriate policy checks via registration server 40 and potentially, signing authority 60. The audit history of an unconfigured device can be provided to registration server 40, upon request. Registration server 40 may ensure that the audit history of a device does not violate any internal policies of the domain before providing the unconfigured device with initial privileges in domain 15.

Certification authority 50 provides credentials to network entities and enables domain 15 to be identified by registration server 40 and by signing authority 60. Generally, a certification authority (also called 'certificate authority') is a trusted network entity that certifies that other network entities (e.g., domains, servers, clients, network elements, computing devices, etc.) are who they say they are. In one implementation, a certification authority verifies the identity of a network entity and grants a certificate to the network entity, which can be signed using a private key of the certification authority. In accordance with embodiments disclosed herein, when a new device receives authorization to join a network (e.g., from signing authority 60), the new device can 'enroll' with the network by requesting a credential, which can be provided by an authorized element of the network. In one instantiation, the authorized element of the network can be a certification authority, such as certification authority 50, which issues the new device a certificate. The certificate can provide authentication for the new device to communicate with other elements of the network.

The certification authority can have its own certificate (or root certificate) including a root public key (e.g., public key 52), which it can publish. The certification authority can also have a private key, which is securely maintained. Other network entities (e.g., registration server 40, new device 20, signing authority 60) can use the certification authority's root certificate to verify signatures made by the certification authority. Certification authority 50 of domain 15 can be implemented in a local or remote machine (e.g., a server) or integrated with registration server 40. A numerical description identifying the domain can be derived from public key 52 of a domain root certificate of certification authority 50. In example embodiments, the numerical description represents the domain identity of domain 15 and can be a cryptographic key or hash of the root public key of the domain (e.g., public key 52). Any suitable hashing technique could be used such as, for example, a secure hash algorithm (e.g., SHA-1). The cryptographic key or hash of the root public key is referred to herein as 'domain hash' or 'domain identifier.'

Registration server 40 can provide the domain hash to signing authority 60, which enables signing authority 60 to recognize registration authority 40 and reply with appropriate authorization results. Additionally, authorization results from registration server 40 may be communicated to certification authority 50. This communication can occur after registration server 40 has received an authorization token from signing authority 60 for new device 20 and after evaluating and approving the audit history of new device 20. Finally, any suitable method may be employed to communicate the authorization results to certification authority 50. For example, the results could be communicated via a discrete message from registration server 40 to certification authority 50, via a shared database, or via registration server 40 informing existing device 30 to allow or disallow communication with certification authority 50.

Turning to FIG. 4, an interaction diagram 400 illustrates potential operations that may be associated with one embodiment of the system for enabling unconfigured devices to join an autonomic network in a secure manner. In this scenario, registration server 40 communicates with signing authority 60 after receiving a device identifier from new device 20 when it attempts to join domain 15. In FIG. 4, various messages, replies, responses, and requests are communicated between components of the system, and can be in the form of electronic messages (e.g., TCP/IP packets, or other appropriate protocol).

Initially, at 402, new device 20 can boot up and initiate adjacency discovery using any appropriate adjacency discovery protocol as previously discussed herein. Generally, a domain certificate, a device identifier, and a nonce are contained in an adjacency discovery message. Because an unconfigured device has no initial configuration, new device 20 does not have a domain identifier or domain name (or any other relevant information), but can have a device identifier such as a manufacturer's secure unique device identifier (SUDI or 'secure UDI'). In one example embodiment, the SUDI can be based on an existing credential such as an IEEE 802.1AR IDevID. A nonce, which could be a random number generated by new device 20, or an equivalent value such as a number directly associated with the adjacency discovery exchange, is included in the adjacency discovery message from new device 20. If a nonce is present in an adjacency discovery message from new device 20, then it can be carried in subsequent communications, until it is received and verified by new device 20 in a completed information package.

Generally, an unconfigured device may try to join the first autonomic network it detects via an existing device. Accordingly, new device 20 can initiate adjacency discovery at 402, by sending an adjacency discovery message with its device identifier (e.g., SUDI) and an empty or null domain certificate to one or more existing devices, such as existing device 30. New device 20 may initially be designated as untrusted since the domain certificate is null or blank in the discovery message. If new device 20 does not contain a SUDI, then an unsecured unique device identifier ('unsecure UDI') may be provided in the discovery message and in additional communications between elements illustrated in FIG. 4.

Existing device 30 in autonomic network 15 receives the discovery message from new device 20 and may act as a proxy to assist new device 20 in joining domain 15. At 404, existing device 30 can respond to new device 20 with an adjacency discovery response that contains a device identifier of existing device 30, which may be a domain-specific device identifier rather than a manufacturing unique device identifier. The discovery response may also include the domain certificate of domain 15.

When existing device 30 discovers new device 20 without a domain certificate, existing device 30 provides, at 406, a new device notification to registration server 40, which informs registration server 40 that a new (unconfigured) device has attempted to connect to domain 15. Existing device 30 may communicate information to registration server 40 such as a domain-specific device identifier of existing device 30, the device identifier (e.g., secure or unsecure UDI) of new device 20, interface information indicating which network interface of existing device 30 is coupled to new device 20, and a client nonce generated by new device 20. The information can be communicated to registration server 40 over a secure control plane.

Upon receiving the information related to new device 20, registration server 40 can perform a basic validation of new device 20 at 407. In one embodiment, basic validation module 42 may be configured to perform the basic validation, which includes verifying domain local information by determining the validity of the device identifier of device 20. For example, if the device identifier is a secure UDI (e.g., from a manufacturing installed certificate), then it can be verified using the manufacturer's public key. Alternatively, an unsecure UDI could be verified according to network administrator defined criteria. For example, an unsecure UDI could be verified against a list of legitimate devices owned or controlled by the entity associated with domain 15. A list of legitimate devices may be obtained in a number of different ways. The UDIs of purchased or otherwise acquired devices could be manually entered, loaded from a bill-of-sale, or scanned in from a barcode. Loading information from a bill-of-sale could include integration with the sales process, while scanning UDIs from barcodes could include scanning software and integration. Alternatively, all UDIs could be accepted with complete dependence on signing authority 60 for security. In other implementations, all UDIs with some additional validations related to the devices' audit histories (e.g., verification that no previous domain is listed in the audit log, verification that no previous domains listed in the audit log are 'nonceless', etc.) could be accepted.

Additionally, at 407, basic validation could include determining the device type of new device 20 and whether device 20 is authorized to connect to the network at a specific location (e.g., at an interface specified on existing device 30). These policies can be preconfigured by a network administrator. Example options could include specified UDIs allowed to connect on specified devices, specified UDIs allowed to connect on any devices, any UDIs allowed to connect to any device, or any UDIs allowed to connect on specified devices/interfaces.

If new device 20 is validated, then information package module 44 can create an initial basic registration information package ('initial information package') to provide to signing authority 60. Initial information package can bind together identity information of domain 15 (e.g., domain hash) and identity information of new device 20 (e.g., device identifier). In one example implementation, this domain hash can be derived from public key 52 of certification authority 50. The identity of new device 20 can be the secure UDI, such as IEEE 802.1AR IDevID, of device 20. Alternatively, an unsecure UDI may be provided if device 20 does not contain a secure UDI.

Other information may also be included in the initial information package for informational purposes or to enhance security. One example includes a nonce, which could be a random number generated by new device 20 and provided with other information in the initial discovery messages to existing device 30. Registration server 40 could determine whether a nonce is appropriate, based on policy. If a nonce is received from new device 20, then it can provide additional security to communications between domain 15 and signing authority 60 and, therefore, may be desirable. In some implementations, however, a policy may be implemented to allow nonceless registrations by new devices. Thus, such a policy could allow new device 20 to accept a nonceless response from signing authority (e.g., in a completed information package) even if the new device was deployed and actually generated a nonce for a discovery message. Such an implementation could allow the nonceless response from signing authority 60 to be re-used if needed. Furthermore, in an alternative embodiment that will be further described herein with reference to FIG. 6, registration of a new device may occur prior to the new device initiating adjacency discovery and, therefore, a nonce may not be used. In another example of additional information provided to signing authority 60, the initial information package may be signed by registration server 40, which can be used to verify the domain of registration server 40.

Registration server 40 can register new device 20 to domain 15 by providing the initial information package to signing authority 60 at 408, and receiving an authorization token at 410 that authorizes the unconfigured new device to join the domain. In backend processing at 409, backend processing module 64 of signing authority 60 can validate the domain and device identified in the initial information package and communicate the results of the validation via a reply to registration server 40. If the validation is successful, then the reply contains an authorization token as indicated at 410. Essentially, an authorization token authorizes a new device (corresponding to a device identifier in the authorization token) to join a domain (corresponding to a domain identifier in the authorization token), where the domain is the domain of the registration server that provided an initial information package with the device identifier and the domain identifier.

Initially, to register new device 20, registration server 40 shows possession of the domain identifier (e.g., domain hash) of domain 15. This provides proof to signing authority 60 that registration server 40 is a valid representative of the domain. In one example embodiment, this proof can be provided during transport layer security (TLS) client authentication. A client certificate chain can be presented to signing authority 60 and verified to contain an extension and subject key identifier of registration server 40 (e.g., in accordance with Network Working Group, Request for Comments (RFC) 5280, section 4.2.1.2, May 2008). The subject key identifier can be extracted as it represents the domain identifier. In another embodiment, the domain identifier (e.g., the domain hash) of registration server 40 can be verified by signing authority 60 if the initial information package is signed by registration server 40 using, for example, public key cryptography standards #7 (PKCS #7) or Cryptographic Message Syntax (CMS) with the client certificate chain included. A PKCS #7 or CMS signed message from registration server 40 can contain a series of signatures on the message data, and on the certificate chain that signed the message data, which is terminated by the root public key.

The domain identity can be verified by examination of the certificate chain presented by registration server 40. The certificate chain can be walked from the registration server certificate to the domain root certificate (e.g., from certificate authority 50) to verify that the domain root certificate's public key (e.g., public key 52) matches the domain hash (and/or the subject key identifier, which is equivalent to the domain hash). Public key 52 can be extracted from the domain root certificate and hashed per a defined hashing algorithm. The value from the hashing algorithm can be compared to the domain hash in the initial information package (and/or the subject key identifier). In addition, by walking the certification chain, each certificate in the chain (i.e., all certificates used to authenticate registration server 40) can be verified, and the domain root certificate can be evaluated to ensure that it is properly self-signed. Verification of the certificate chain and verification that the hashed domain root public key matches the domain hash provides proof that registration server 40 is in fact a member of the domain. It is important to note, however, that in the aforementioned embodiments, signing authority 60 may not necessarily verify the domain identity itself (i.e., that the domain is associated with a particular customer identity), but rather, may simply validate that registration server 40 is a valid representative of the identified domain.

Alternative checks may also be implemented to verify that registration server 40 is a valid representative. For example, a database can be configured to store identities for each authenticated registration server and associated domain hashes. This information could be pre-populated, for example, from an integrated sales channel. Thus, an alternate check may include performing a database lookup for registration server 40 and verifying that it is associated with the domain hash.

In some embodiments, additional client authentication, such as Hypertext Transfer Protocol (HTTP), may be provided. This can provide a binding between inner messages and a particular username/password identified account. Thus, registration server 40 can be authenticated to represent the domain by a username/password and database lookup. Although the exchanges between signing authority 60 and registration server 40 could be dependent on Hypertext Transfer Protocol Secure (HTTPS) and leverage the HTTPS layer for authentication, these exchanges could also be transport independent. Moreover, authentication between signing authority 60 and unconfigured devices are transport independent.

In one embodiment, if registration server 40 is determined to be a valid representative of domain 15 (e.g., the domain hash of registration server 40 is verified by proof of possession or by registration server 40's signature on the initial information package, which is associated with a consistent certificate chain rooted in the domain certification authority with a public key that matches the declared domain identity), then at 409 of FIG. 4, signing authority 60 authorizes new device 20 to join the domain 15. Validation that device 20 is authorized to join domain 15 may be provided by appropriate domain and device specific authorization credentials of an authorization token sent to registration server 40 at 410. The authorization token may be signed by signing authority 60 with a key known to be trusted by new device 20. These authorization credentials can then be presented to new device 20 by registration server 40. Signing authority 60 can issue authorization tokens to registration server 40 on a device-by-device basis.

The authorization token validates that new device 20 is authorized to join domain 15 by providing appropriate domain and device specific authorization credentials. In one example embodiment, an authorization token may include a new device's UDI, a domain identifier, a nonce (from the new device), timestamp information, and a signature of signing authority 60. The device and domain identifiers in the authorization token can be the same device and domain identifiers from the initial information package received at 408. Similarly, if a nonce was received from registration server 40 in the initial information package, then it may be included in the authorization token. Timestamp information is optional and could represent the time, for each domain identifier, when the authorization token was generated. Finally, the signature is generated from a key known to be trusted by new device 20. For example, the signature could be from signing authority 60's own private key based on a key pair rooted in the manufacturer's chain of trust. Credential 22 of new device 20 enables device 20 to verify the signature from signing authority 60, thereby validating the trust chain.

In backend processing at 409, the domain identifier and device identifier can be recorded in audit history database 69. Additionally, a nonce received in the initial information package, or an indication of whether a nonce was received, may also be logged. In some embodiments, all requests of any form may be logged in audit history database 69. Additionally, other appropriate information can be recorded in audit history database 69 including, for example, information indicating which devices were authorized to join a domain and which devices were not authorized to join a domain, the time of the authorization requests, nonces associated with rejected authorization requests, an indication that a rejected authorization request was nonceless, etc. The audit history of a new device, such as new device 20, can be used by registration server 40 to make security decisions by enforcing, for example, customer-configured policies based on the audit history.

In some embodiments, policy checks may also be implemented by signing authority 60 to enable dynamic adjustments to the security model after an unconfigured device has been deployed. Dynamic adjustments may also be made before the new device is even registered to a domain (e.g., when a device is sold and in transit). In particular, correlation requirements between domains (or entities who own or otherwise control the domains) and specific devices can be dynamically adjusted to enhance the security per domain/entity or per device. The correlations can be implemented using, for example, device identifiers of the autonomic devices and domain hashes of the corresponding domains. In one example embodiment, a policy implemented by signing authority 60, which can be stored in customer policies database 67, can require verification that a new device, identified in an initial information package, belongs to the domain identified in the same initial information package. In this embodiment, device database 68 correlates devices with domains, and the domains can be mapped to associated entities. For instance, a domain identifier corresponding to an entity that has ownership or control of a particular device (e.g., a router) can be correlated to a device identifier representing the router. This correlation can be stored, for example, in device database 68. When signing authority 60 receives an initial information package at 408, device database 68 can be searched to determine whether the router's UDI is correlated to the domain identifier from the initial information package. If it is determined that the router's UDI is correlated to the domain identifier from the initial information package, then validation that the router is authorized to join domain 15 may be provided by an authorization token (with an appropriate signature) sent to registration server 40 at 410. If the router's UDI is determined not to be correlated to the domain identifier from the initial information package, then signing authority 60 may reject the request for authorization and send an appropriate reply.

For illustration purposes of another example policy that could implemented by signing authority 60, assume two separate entities, Customer A and Customer B, each have autonomic networks that are configured with registration servers that can communicate with signing authority 60 to register new devices. A policy could be implemented by signing authority 60 (e.g., via customer policies database 67) in which all unconfigured autonomic devices acquired by Customer A (and correlated in device database 68 to Customer A's corresponding domain identifier) are blacklisted from having an authorization token issued to an entity other than Customer A. Consequently, if Customer B purchases a stolen device, which was previously acquired by Customer A, then signing authority 60 may refuse to issue an authorization token to authorize the device to join Customer B's autonomic network.

In another example, a policy that requires nonce requests may be implemented in signing authority 60 for a particular entity/domain. In this scenario, registration server 40 may not request authorization for new device 20 to join domain 15 until new device 20 is actually deployed, initiates adjacency discovery, and provides its secure or unsecure UDI, along with a nonce. Otherwise, a nonceless request may be rejected by signing authority 60 and no authorization token issued. Accordingly, even if new device 20 has code that does not require a nonce (e.g., when registration server 40 is configured to pre-fetch authorization credentials by receiving and registering a device identifier before the new device corresponding to the device identifier is deployed, as will be further described with reference to FIG. 6), the requirement can nevertheless be implemented by changing policies in customer policies database 67 of signing authority 60. Moreover, the policy can be implemented on a per entity/domain or per device basis. In a further example, a policy may provide for checking device history for previous authorizations. If a device has been previously registered to another domain, then signing authority 60 may reject the authorization request.

The ability to configure policies for signing authority 60 may be provided to customers that are authorized by signing authority 60. Signing authority 60 may provide an interface for network administrators of the customers to request certain policies be implemented. The interface could be provided either via the customer's registration server interface or via a web based cloud service interface. Signing authority 60 may have APIs that are exposed to allow authorized customers to request certain policies be implemented per domain or per device. For example, an API may allow a customer to request signing authority 60 not distribute authorizations to alternate domains for the customer's autonomic devices, thereby preventing theft from the customer. Another API may allow the customer to request notification if a device authorization is issued. The ability to scale security requirements on a per domain (or deployment) and/or per device basis provides a unique combination of security and flexibility.

With reference again to FIG. 4, if the initial information package is validated in backend processing at 409, and policies do not prevent the new device 20 from joining domain 15, then an authorization token is created and sent to registration server 40 at 410. At 412, registration server 40 may send a request to signing server 60 for the audit history of new device 20. Although a device audit history may be requested at any time, registration server 40 may make this request prior to sending authorization credentials to new device 20, because its own device audit history can help verify that it has not been compromised. Moreover, policies may be included in audit history policies database 47 that require an audit history of device 20 to be accessed and verified prior to forwarding an authorization message (e.g., a completed information package) to new device 20, allowing new device 20 authorized access to domain 15.

The audit history request may be preceded by another TLS client authentication between registration server 40 and signing authority 60, which has been previously described herein. A client certificate chain can be presented to signing authority 60 and verified. Additionally, the domain hash associated with registration server 40 may also be verified (e.g., when the client certificate chain is walked to the domain root certificate). Also, as previously described herein, additional HTTP-based client authentication may be performed.

The audit history request can be sent to signing authority 60 at 412 after successful client authentication and can include the device identifier (e.g., secure UDI) of new device 20. In some implementations and particular scenarios, the audit history request could contain a list of device identifiers. The request can be authorized and a response can be generated by backend processing module 64 of signing authority 60, if the domain identifier of registration server 40 (e.g., the subject key identifier extracted from the client certificate) is listed in audit history database 69 and mapped to new device 20 (e.g., by device identifier). In particular, if registration server 40 has previously registered new device 20, then the domain identifier associated with registration server 40 could be listed in audit history database 69 and mapped to the device identifier of new device 20. Signing authority 60 can record the domain identifier of registration server 40, mapped to the device identifier of new device 20, in audit history database 69 as an audit request. Furthermore, if the device identifier is not listed in audit history database 69, then signing authority 60 may add an audit entry for the audit request, before responding to the audit request.

An audit history report can be created if the domain identifier of registration server 40 is mapped to device 20 in audit history database 69 (e.g., if registration server 40 or some other registration server previously registered new device 20). Application programming interfaces (APIs) of signing authority 60 may be exposed to discover prior domains new device 20 has been authorized to join, thus allowing registration server 40 to make policy decisions based on the audit history of the device. In example embodiments, the audit history report for a particular device can include a domain identifier list and transactions associated with domain identifiers in the list. In other embodiments, the actual domain identifiers may not be disclosed but rather, one or more counts may be provided to indicate the number of times each transaction occurred or to simply indicate a total number of transactions. In addition, a nonce and timestamp information may also be included in the response. If a nonce was received from registration server 40 in the audit history request, then it may be included in the audit history response. Although a nonce associated with an audit history request is optional, it could enable registration server 40 to associate specific authorization requests with specific audit history reports. Timestamp information is optional and could represent the time, for each domain identifier, when the audit history report was generated.

Upon receiving the audit history report of new device 20, registration server 40 can perform policy checks at 415 based on the audit history report. In one embodiment, audit history policy module 46 could be configured to perform the policy checks at 415 and audit history policies database 47 could be configured to store policies. If the audit history report indicates that new device 20 has not been registered to any other domain, then new device 20 is not blocked from joining domain 15. Generally, policies may be applied to prevent new device 20 from joining domain 15 if the audit history report indicates new device 20 has been registered to one or more other domains that are unacceptable to the entity associated with domain 15.

Policy checks may be performed to determine whether nonceless responses contained in the audit history report of new device 20 are acceptable to the entity associated with domain 15. In one example policy, if prior authorizations before a particular date do not contain nonces, then device 20 can be tagged as possibly compromised and/or previously owned. In this scenario, a policy assessment could be performed and device 20 could be cleaned. If prior authorizations do contain nonces, however, then high security infrastructures may ensure that new device 20 has been rebooted so that nonces in previously signed authorizations do not match and thus cannot be used. In another example policy, if prior authorizations before the last known reboot of new device 20 contained nonces, then such authorizations can be ignored, because in this situation, new device 20 could reject the nonces as stale. In a further example policy, if recent authorizations (e.g., since the last known reboot of new device 20) contain nonces that registration server 40 has not seen and/or domain identifiers that registration server 40 has not seen, then new device 40 could be flagged as likely compromised.

If audit history policies do not prohibit new device 20 from joining autonomic network domain 15, then registration server 40 can create a completed basic registration information package ('completed information package') to send to new device 20. The completed information package provides new device 20 with authorization information such that new device 20 can determine whether to join domain 15, by verifying the domain itself. In one embodiment, the completed information package can be the authorization token, which includes the device identifier, the domain hash (i.e., hash of the root public key for the domain), and an authorization signature of signing authority 60. The authorization token may also include a timestamp and/or a nonce (if present) in the authorization token. Thus, in such an embodiment, 'generating' the completed information package includes performing any necessary or desired functions to prepare the authorization token (or desired information from the authorization token) to be sent to new device 20, possibly via existing device 30 In other embodiments, the completed information package can include the authorization token (with at least the device identifier, domain hash, and signature of signing authority 60) and additional information such as a new device identifier that is domain-specific. Furthermore, a completed information package may be signed by registration server 40, which includes a signature and public key of registration server 40. The registration server 40's credentials can match the domain identifier information. Registration server 40 can sign the entire package, including the authorization token, or just the new information (e.g., domain-specific device identifier) in the package. The inclusion of the signature of registration server 40 is optional, but can be used to reduce the amount of network traffic between new device 20 and registration server 40 if additional information, besides the authorization token, is included in the completed information package.

With reference to FIG. 4, the completed information package can be forwarded to existing device 30 at 416, and existing device 30 can then forward it to new device 20 at 418. In one embodiment, the completed information package may also serve as the adjacency discovery response of 404. New device 20 receives the completed information package and, in one embodiment, validation module 24 and domain registration module 26 can perform trust validation and domain registration activities at 419. First, if a nonce is not included with the completed information package at 418, then the package is accepted and verification of the signatures can be performed. If a nonce is included in the completed information package at 418, however, then new device 20 determines whether it is accurate (e.g., equivalent to the nonce previously generated by new device 20 and included in the adjacency discovery message at 402). If the nonce is not accurate, then the completed information package can be rejected. Otherwise, if the nonce is accurate, then the completed information package is accepted and trust validation can be performed.

Validation of the completed information package can include verifying the signature of signing authority 60 and verifying signing authority 60 is trusted. A valid signature of a trusted signing server 60 effectively validates the information (e.g., domain hash) in the completed information package. Although any suitable trust mechanisms can be used for validation, in one example implementation, PKI techniques can be used to validate the information based on the new device's credential 22. Using PKI techniques (e.g., CMS, PKCS #7, etc.), the authorization signature from signing server 60 can be verified by using a public key corresponding to the private key used by signing authority 60 to create the authorization signature. The signing authority 60 can be verified as trusted by, for example, verifying its server certificate with new device 20's own manufacturer credentials. Thus, the trust chain can be validated. This is possible because the private key used by signing authority 60 to sign the authorization token can be issued by the manufacturer of new device 20 and new device 20 can, therefore, use its own credential 22 (e.g., manufacturing installed certificate such as an IEEE 802.1AR IDevID with manufacturing root public key) to validate it. More specifically, credential 22 can be a manufacturer root certificate that is also the root of the signing authority server certificate in signing authority 60. New device 20 can verify the authorization signature from signing authority 60 in the completed information package by verifying it was made by the signing authority certificate. New device 20 can verify the signing authority server certificate itself by verifying it was signed by the manufacturer root certificate. This validation affirms that the domain is authorized to add new device 20 to domain 15 and, therefore, unconfigured new device 20 now has sufficient information to trust the domain 15.

The outer signature provided by registration server 40, if provided in the completed information package, can also be validated. Validation of the outer signature can be achieved by confirming the domain root credential matches the domain hash and by verifying the outer signature itself based on any suitable trust mechanisms (e.g., CMS, PKCS #7, etc.). Registration server 40 is a member of domain 15 and, therefore, its certificate is signed by the domain root. The domain hash in the completed information package is actually the hash of the domain root public key data (e.g., public key 52 of certification authority 50). Thus, the domain hash (verified from the validation of signing authority 60's signature) can be extracted from the completed information package and used to validate the signature of registration server 40. More specifically, in one example implementation, the domain hash can be verified by walking the certification chain from the registration server certificate until the chain terminates at the domain root certificate (e.g., of certification authority 50), as previously described herein. The root public key of the domain root certificate can be evaluated to determine whether it matches the domain hash extracted from the completed information package. More specifically, public key 52 can be extracted and hashed per a defined hashing algorithm and the value from the hashing algorithm can be compared to the domain hash extracted from the completed information package. If they match and the domain root certificate is properly signed, then the domain root certificate is trusted. If the certification chain is verified, then a domain hash encoded in registration server 40 is validated. Finally, the outer signature of the completed information package 40 can be verified using any suitable trust techniques (e.g., CMS, PKCS #7, etc.).

In an alternative embodiment in which the functions of signing authority 60 are integrated with registration server 40 (e.g., registration server 40 is authorized as a signing authority), the credential is pre-issued to registration server 40. Registration server 40 could have a certificate issued by signing authority 60 (or otherwise provided by the manufacturer associated with signing authority 60). Accordingly, in this embodiment, the completed information package includes a credential from registration server 40 that was pre-issued from the manufacturer.

In some cases, new device 20 might not have its own specific device identity certificate installed and, therefore, new device 20 could have an unsecure UDI rather than a secure UDI. In this scenario, however, new device 20 could still have the manufacturer's root certificate to enable verification of signing authority 60's signature.

Once new device 20 validates the trust chain from signing authority 60, domain registration can be achieved by configuring new device 20 and registering new device 20 with the domain. First, new device 20 can be configured with the validated domain hash from the completed information package. New device 20 can also be configured with a new domain-specific device identifier if one is included in the completed information package. Next, a device clock in new device 20 can be set to match domain 15. Optionally, an RSA key-pair (e.g., public/private keys) can be created using the new domain-specific device identifier and the domain identifier.

If the trust chain from signing authority 60 is validated, then automatic enrollment in domain 15 is enabled. Validating the trust chain provides new device 20 with sufficient information (e.g., the domain hash) to properly identify a certification authority (CA) enrollment server (e.g., a Simple Certificate Enrollment Protocol (SCEP) or EST server) as being an authorized member of the domain. For example, the same (or similar) validation checks used by new device 20 to identify registration server 40 as a member of domain 15 can be used to identify a CA server, such as certification authority 50. Similarly, a server authorization process of a CA enrollment server has sufficient knowledge to authorize new device 20 to obtain an enrollment certificate (e.g., by making the same checks as registration server 40 or by leveraging the results of the checks registration server 40 made). The checks include determining whether new device 20 is a member of domain 15. Thus, enrollment of new device 20 to domain 15 can be fully automated. Furthermore, registration server 40 could act as a CA enrollment server and simply forward authorized enrollment requests to the CA enrollment server. While SCEP/EST/certificate enrollment allows a local certificate to be issued that can be used for subsequent protocol operations, any other appropriate protocols may also leverage the results of new device 20 obtaining authorization from signing authority 60 to join domain 15.

By way of example with reference to FIG. 4, new device 20 can obtain a local certificate from registration server 40 using a SCEP enrollment protocol. New device 20 can create a certification enrollment request, which is then passed to existing device 30 at 420, along with the public key of new device 20. This enrollment request can be securely transmitted to registration server 40 either by signing the request or by a secure transport. Registration server 40's domain-specific public key, which may have been received in the completed information package, can be used to sign the enrollment request. Thus, the enrollment request cannot be hijacked or modified. Existing device 30 can act as a proxy and, at 422, can send the certification enrollment request to registration server 40 on behalf of new device 20. Registration server 40 receives the enrollment request, causes a domain-specific certificate for new device 20 to be signed, and sends it to the new device at 424. Existing device 30 may again act as a proxy and, at 426, forward the signed, domain-specific certificate to new device 20.

When new device 20 receives the signed certificate, it can install the certificate and re-start normal autonomic adjacency discovery using the newly issued domain-specific certificate for authentication. Adjacency discovery could be performed using any suitable protocol such as, for example, IEEE 802.1x or any other suitable protocol, some of which have been previously discussed herein. In one example, an adjacency discovery message can be sent to existing device 30 at 428. In this adjacency discovery message, however, the domain certificate value can include the domain identifier for domain 15. In addition, the device identifier can be the new domain-specific device identifier, which may have been received in the completed information package and used to configure new device 20 with a domain-specific identity. Existing device 30 can send an adjacency discovery response message at 430 providing the same domain certificate and its own device identifier. Discovery can be completed without the need for signing authority 60 or registration server 40, and new device 20 can join domain 15. Thus, autonomic devices in domain 15, such as new device 20, are enabled to authenticate and authorize each other independently.

FIG. 5 illustrates a table 500 with message descriptions and possible message contents of various example messages that may be communicated in the system, as illustrated in the interaction diagram of FIG. 4. Adjacency discovery illustrated at 402 and 428 of FIG. 4 is represented by entry 502 of table 500. Adjacency discovery response illustrated at 404 and 430 of FIG. 4 is represented by entry 504 of table 500. New device notification illustrated at 406 of FIG. 4 is represented in entry 506 of table 500. Initial information package illustrated at 408 of FIG. 4 is represented in entry 508 of table 500. Authorization token illustrated at 410 of FIG. 4 is represented in entry 510 of table 500. Audit history request illustrated at 412 of FIG. 4 is represented in entry 512 of table 500. Audit history report illustrated at 414 of FIG. 4 is represented in entry 514 of table 500. Completed information package illustrated at 416 and 418 is represented in entry 516 of table 500. Certification enrollment request illustrated at 420 and 422 is represented in entry 518 of table 500. Finally, signed certificate illustrated at 424 and 426 of FIG. 4 is represented in entry 520 of FIG. 5.

Turning to FIG. 6, an interaction diagram 600 illustrates potential operations that may be associated with one embodiment of the system for enabling unconfigured devices to join an autonomic network in a secure manner. In this scenario, pre-authorization is obtained for new device 20 to join domain 15, before new device 20 is deployed in the network. In FIG. 6, various messages, replies, responses, and requests are communicated between components of the system, and can be in the form of electronic messages (e.g., TCP/IP packets, or other appropriate protocol). In addition, contents of these messages may be the same or substantially similar to the messages indicated in FIG. 6, albeit without a nonce from new device 20.

In FIG. 6, communications between new device 20, existing device 30, registration server 40, and signing authority 60 may be the same or substantially similar to communications between the same elements described with reference to FIG. 4. In the scenario depicted in FIG. 6, however, a device identifier (e.g., a secure UDI such as IEEE 802.1AR IDevID, an unsecure UDI) for new device 20 is provided to registration server 40 prior to new device 20 attempting to connect to domain 15. Thus, new device 20 may not even be physically deployed in the autonomic network before being authorized by signing authority 60 to join the autonomic network's domain.

In the operational scenario of FIG. 6, a device ID medium 80 represents out-of-band or manual methods of providing a new device identifier (e.g., a secure or unsecure UDI) to registration server 40 at 602. By way of example, this scenario could occur if new device 20 had been purchased and was en route to the owner or controlling entity of domain 15. In one potential implementation, device ID medium 80 could represent a manufacturing order or sales process configured to provide the manufacturer's credentials that are assigned to new devices to entities who purchase (or otherwise control) the new devices. In another embodiment, the new device ID medium 80 represents a manual process of providing new device identifiers to registration server 40 (e.g., USB flash drive, optical disc storage, paper or electronic file which is read and manually entered into registration server 40 by an administrator, etc.).

Upon receiving the secure UDI (or unsecure UDI in other scenarios) assigned to new device 20, registration server 40 can perform a basic validation of new device 20 at 603, as previously described herein. In particular, basic validation at 603 includes verifying domain local information by determining the validity of the UDI of device 20. However, other basic validation functions that verify whether device 20 is allowed to connect on a particular interface and/or a particular device in domain 15, may not be performed when there is no adjacency discovery by new device 20.

If new device 20 is validated at 603 (based on the potentially limited validations performed in this operational scenario), then information package module 44 can create an initial basic registration information package ('initial information package') to send to signing authority 60 at 604. As previously described herein, the initial information package can bind together identity information of the domain and identity information of new device 20. Policies can allow the initial information package created in this scenario to be created without a nonce from new device 20, because new device 20 has not yet engaged in an adjacency discovery exchange with any autonomic devices in the domain. Although these pre-authorization communications with signing authority 60 may become stale without the benefit of a nonce, a completed information package using information from these communications (e.g., authorization token) may still be accepted by new device 20. The flexibility provided by this approach may override any potential decrease in security.

Registration server 40 can register new device 20 to domain 15 by providing the initial information package to signing authority 60 at 604, and receiving an authorization token at 606 that validates new device 20 is authorized to join domain 15. At 605, backend processing of signing authority 60 can include validating the domain and device identified in the initial information package and communicating the results of the validation via a reply to registration server 40. If the validation is successful, then the reply contains an authorization token as indicated at 606. The registration of new device 20, including backend processing of signing authority 60 at 605, can be performed as previously described herein.

An audit history request can be made by registration server 40 at 608, and signing authority 60 can provide an audit history report to registration server 40 at 610. Policy checks may be performed on the audit history report at 611. At this point, if audit history policies do not prohibit new device 20 from joining domain 15, then registration server 40 can save the authorization token, which was received at 606 from signing authority 60. When new device 20 attempts to join the domain 15 at some later time, then registration server 40 can fetch the authorization token and create a completed information package, as previously described herein.

Accordingly, once new device 20 is deployed in the autonomic network, at 612 new device 20 can boot up and initiate adjacency discovery with existing device 30. As previously described, the domain certificate value may be blank or null as new device 20 has no initial configuration. However, a manufacturer's secure UDI may be provided in new device 20, and this identifier is included in the discovery message. Alternatively, an unsecure UDI may be provided. Existing device 30 may respond to new device 20 at 614 and, additionally, act as a proxy to assist new device 20 in joining autonomic network domain 15. At 616, existing device 30 provides a new device notification to registration authority 40 that a new (unconfigured) device has attempted to connect to domain 15.

Basic validation that was not performed at 603 may be performed at 617 after receiving the new device notification at 616. In particular, as previously described herein, basic validation can include determining the device type of new device 20 and whether new device 20 is authorized to connect to domain 15 at a specific location (e.g., at an interface specified on existing device 30).

If new device 20 is validated, then the previously saved authorization token is fetched and registration server 40 creates a completed information package as previously described herein, but without a client-generated nonce, to send to new device 20. The completed information package can be forwarded to existing device 30 at 618, and existing device 30 can then forward it to new device 20 at 620. New device 20 receives and accepts the nonceless, completed information package. As a result, trust verification and domain registration activities occur at 621, as previously described herein.

Once new device 20 validates the trust chain from signing authority 60, by verifying the signature of signing authority 60 and verifying signing authority 60 is trusted, new device 20 can configure itself and register with domain 15, as previously described herein. New device 20 can be configured by setting its device identifier to the new domain-specific device identifier, which may have been received in the completed information package, setting a device clock to match the autonomic network, and optionally, creating an RSA key-pair (e.g., public/private keys). A certification enrollment request can be created, which is then passed to the existing device 30 at 622, along with the public key of new device 20.

Existing device 30 can act as a proxy and, at 624, can send the certification enrollment request to registration server 40 on behalf of new device 20. Registration server 40 receives the enrollment request, causes a domain-specific certificate for device 20 to be signed, and sends it to the new device at 626. Existing device 30 may again act as a proxy and, at 628, forward the signed, domain-specific certificate to new device 20. When new device 20 receives the signed certificate, it can install the certificate and re-start normal autonomic adjacency discovery using the newly issued domain-specific certificate for authentication. An adjacency discovery message, with all the required information (e.g., domain certificate, domain-specific device identifier) can be sent to existing device 30 at 630 and existing device 30 can send a response message at 632. Discovery can be completed without the need for registration server 40 or signing authority 60, and device 20 can join domain 15.

Figure 7B:
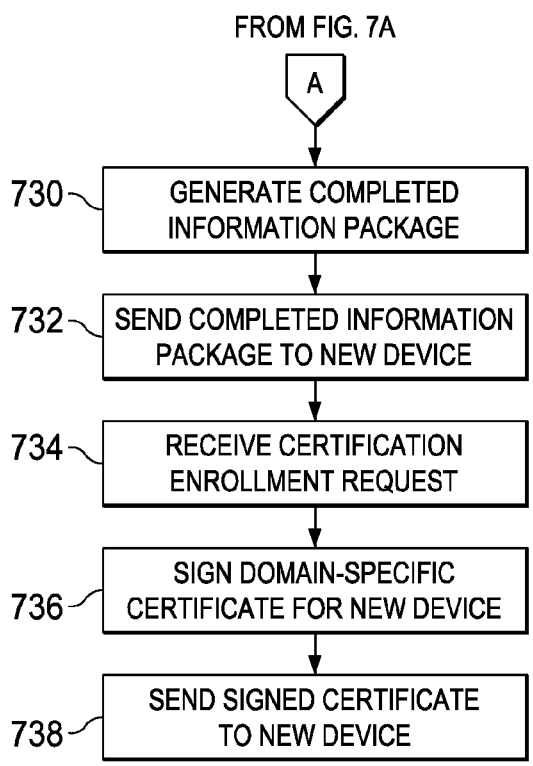
FIG. 7 is a simplified flow chart illustrating example operational steps that may be associated with a registration server in example embodiments of the system.
Figure 8:
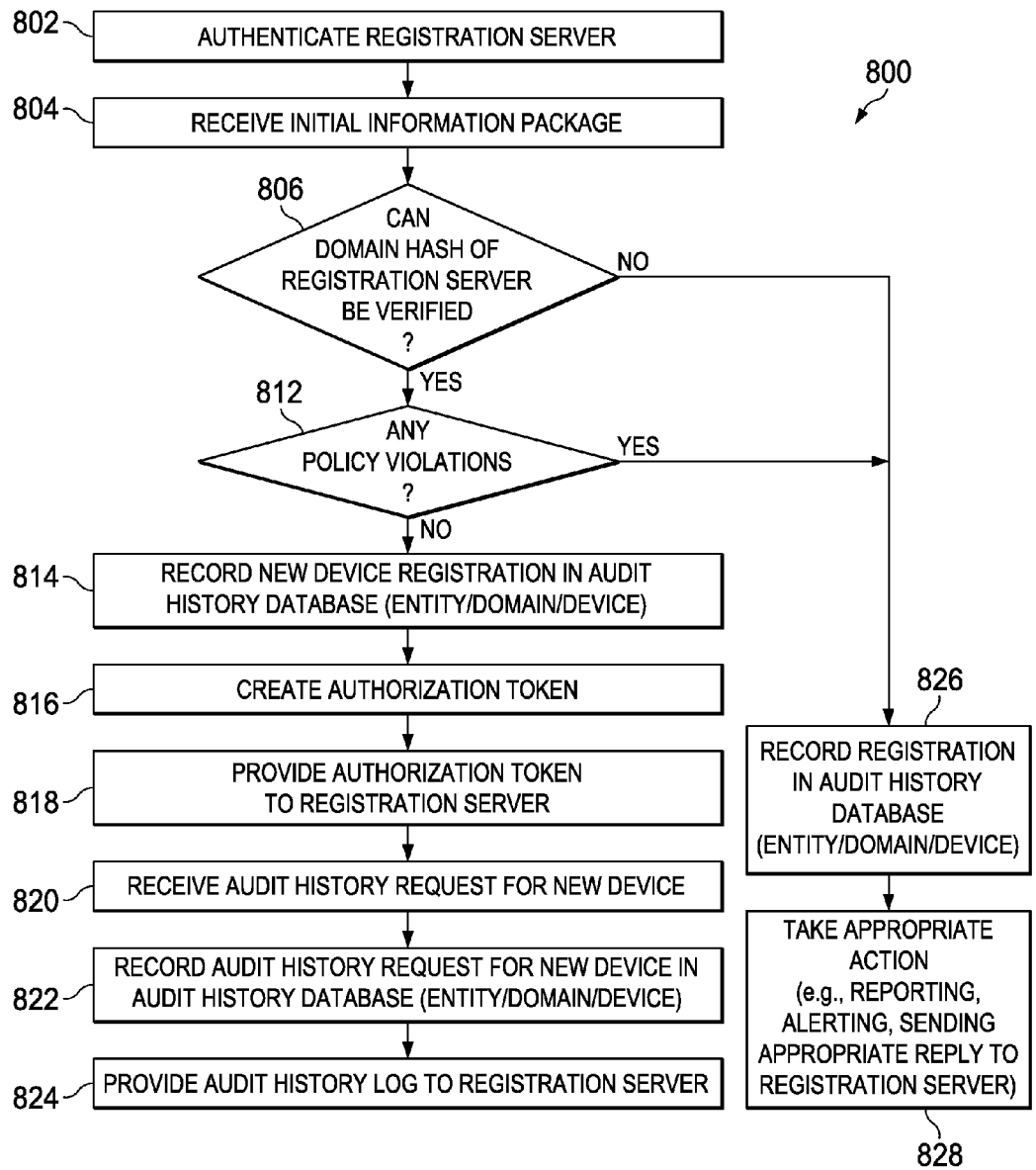
FIG. 8 is a simplified flow chart illustrating additional example operational steps that may be associated with a signing server in example embodiments of the system.

Turning to FIGS. 7-9, flowcharts illustrate example operational steps that may be associated with registration server 40, signing authority 60, and new device 20, respectively. In FIG. 7A-B, flow 700 illustrates example operational steps that may be performed by modules of registration server 40 in accordance with an embodiment of the system. The modules of registration server 40 could be discrete or integrated in any suitable manner. For ease of reference, flow 700 will be described without specific reference to particular modules of registration server 40.

At 702, registration server 40 receives a device identifier for new device 20. The device identifier can be a manufacturer's credential such as a secure UDI (e.g., IEEE 802.1AR IDevID), or if new device 20 does not have a secure UDI, then an unsecure UDI could be provided. The device identifier could be received from existing device 30 via a new device notification message or from device ID medium 80, which communicates new device identifiers to registration server 40.

At 704, basic validations of new device 20 can be performed based on domain local information. For example, verifications can be performed as to whether the new device is on the correct domain and whether the new device is in the correct location in the domain. For the first verification, a secure UDI can be verified using the corresponding manufacturer's public key. An unsecure UDI could be verified according to network administrator defined criteria. At 706, if new device 20 is determined not to be on the correct domain, then flow passes to 708, where new device 20 can be denied network access and any other appropriate action may be taken (e.g., reporting, alerting, logging, dropping the device, etc.). If new device 20 is determined to be on the correct domain at 706, then flow passes to 710. Information related to approved locations (e.g., devices/interfaces) where new device 20 can connect can be pre-configured by a network administrator (e.g., specified UDIs allowed to connect on specified devices/interfaces, etc.). Thus, if it is determined that new device 20 is not connected to the network at an approved location (e.g., unapproved existing device and/or unapproved interface), then flow passes to 708, where new device 20 can be denied network access and any other appropriate action may be taken.

If new device 20 is in an approved location in domain 15, as determined at 710, then flow passes to 712, where an initial information package is created. The initial information package can bind together identity information of the domain and identity information of new device 20. The domain identity can be a domain hash, which can be derived from public key 52 of certification authority 50. The identity of new device 20 can be the secure UDI, such as IEEE 802.1AR IDevID, of new device 20. Alternatively, an unsecure UDI may be used if device 20 does not contain a secure UDI. Other information may also be included in the initial information package for informational purposes or to enhance security, and may be based on policy. One example includes a nonce, if one was received from new device 20.

At 714, registration server 40 can provide proof that it is a valid representative of domain 15. In one embodiment, this proof can be provided during TLS client authentication, when a client certificate chain is presented to signing authority 60. Alternatively, this proof could be provided when registration server 40 signs the initial information package and presents a client certificate chain to signing authority 60 for validation at 716, as previously described herein. Although not shown in FIG. 7A, if registration server 40 fails to provide proof that it is a valid representative of domain 15, then new device 20 may not be authorized to join domain 15.

At 718, after signing authority 60 has processed the initial information package, registration server 40 receives a reply. If an authorization token is not received in the reply from signing authority 60, as determined at 720, then flow passes to 708, where new device 20 can be denied network access and any other appropriate action may be taken. If an authorization token was received, however, then flow passes to 722 where registration server 40 may request an audit history to be provided for new device 20. At 724, registration server 40 receives an audit history report (or log) of new device 20 from signing authority 60. At 726, registration server 40 can evaluate the audit history report for policy violations. Audit history policies database 47 may contain policies configured by a network administrator. Any suitable policies may be configured in audit history policies database 47 in accordance with preferences of the entity associated with domain 15, as previously described herein. Generally, if new device 20 has an audit history (e.g., new device 20 has previously been registered to another domain), and if it is determined at 728 that the audit history is unacceptable according to one or more policies in audit history policies database 47, then flow passes to 708, where new device 20 can be denied network access and any other appropriate action may be taken. However, if new device 20 has no audit history because it has never been registered to another domain, or if it is determined at 728 that no policies were violated based on the audit history report, then new device 20 can be allowed to join domain 15 and flow passes to 730.

At 730, registration server 40 creates a completed information package to be sent to new device 20. The completed information package provides new device 20 with sufficient authorization information to enable it to verify the domain and validate the chain of trust with signing authority 60 and, possibly, with registration server 40. The completed information package can include the authorization token (i.e., the device identifier, the domain hash, and the signature of signing authority 60) and possibly other information such as a new domain-specific device identifier. The completed information package may be signed by registration server 40, which can include a signature and public key of registration server 40. The registration server 40's credentials can match the domain identifier information. At 732, registration server 40 can send the completed information package to new device 20 via existing device 30, which may act as a proxy.

At 734, registration server 40 can receive, via a secure transmission, a certification enrollment request from new device 20. Registration server 40 can sign a domain-specific certificate for new device 20 at 728, and can send it to the new device at 730, via existing device 30, which may again act as a proxy.

Turning to FIG. 8, flow 800 illustrates example operational steps that may be performed by backend processing module 64 of signing authority 60 in accordance with an embodiment of the system. Backend processing module 64 of signing authority 60 could be a single module or could be separated into discrete functions based on particular needs. For ease of reference, flow 800 will be described without specific reference to particular modules of signing authority 60.

At 802, signing authority 60 authenticates registration server 40 to establish a communications channel. This may be performed by TLS client authentication in one example implementation. After a communications channel has been established, flow passes to 804, where signing authority 60 receives an initial information package. In one example embodiment, the initial information package can be signed by registration server 40 and can include a certificate chain. The domain hash can be verified by walking the chain until it terminates at the domain root certificate and evaluating the domain root public key (e.g., public key 52). If a hash of public key 52 matches the domain hash of the initial information package, the domain hash can be verified. At 806 it is determined whether the domain hash of registration server can be verified, which could indicate that registration server 40 is a valid representative of domain 15. If the domain hash cannot be verified, then the registration attempt is recorded at 826 in audit history database 69. Flow then passes to 828 where any other appropriate action is taken (e.g., reporting, logging, alerting, sending appropriate reply to registration server, etc.), and authorization tokens are not created, thereby withholding authorization for new device 20 to join network domain 15.

If the domain hash of registration server 40 is verified at 806, then flow passes to 812 to determine whether any policy violations exist. This operational step may be omitted if no customer policies are implemented in signing server 60. Customer policies database 67 may contain policies configured by a network administrator based on customer preferences. Any suitable policies may be configured in customer policies database 67 in accordance with customer preferences, as previously described herein. In particular, a policy could be implemented by signing authority 60 requiring verification that new device 20 is correlated to domain 15 (e.g., verifying new device 20 belongs to an entity that owns or otherwise controls domain 15). Accordingly, device database 68 can be searched for the device identifier of new device 20 contained in the initial information package. Device database 68 can have valid device identifiers correlated or mapped to domains to which they belong. If the device identifier of new device 20 is not found in device database 68, or is found in device database 68 but is correlated to a domain identifier other than the one indicated in the initial information package, then it is determined at 812 that new device 20 does not belong to the entity associated with domain 15, thus violating the policy. Accordingly, flow passes to 826 where the registration attempt is recorded in audit history database 69. Flow then passes to 828 where any other appropriate action is taken, and authorization tokens are not created, thereby withholding authorization for new device 20 to join network domain 15.

Other policies, as previously discussed herein, could also, or alternatively, be implemented by signing authority 60. Moreover, because signing authority 60 can service multiple domains associated with multiple customers, customer policies database 67 could contain policies for many different customers. Accordingly, policies could be implemented per domain and/or per device. For example, per device policies could be requested by a customer and once implemented, such policies could be applied to the corresponding devices, regardless of which domain a device is attempting to join. Thus, thefts can be tracked and the automatic zero-touch registration of a stolen machine can be subverted. If a policy violation is detected at 812, then the registration attempt is recorded at 826 in audit history database 69. Flow then passes to 828 where any other appropriate action is taken, and authorization tokens are not created, thereby withholding authorization for new device 20 to join network domain 15.

If no policy violations are detected at 812, then at 814, the new device registration is recorded in audit history database 69. Signing authority 69 can create an authorization token at 816. The authorization token may include the device identifier and domain identifier from the initial information package, and a signature of signing authority 60 (referred to herein as an 'authorization signature'). Authorization token may also include a nonce (if included in the initial information package) and possibly timestamp information. At 818, the authorization token can be provided to registration server 40 in a reply from signing authority 60.

At 820, signing authority 60 may receive a request for the audit history of new device 20. The audit history request itself may be recorded at 822 in audit history database 69. The request can contain the device identifier (e.g., secure or unsecure UDI) of new device 20, which can be used to search audit history database 69. If the device identifier of new device 20 is found in audit history database 69, then an audit history report is created and provided to registration server at 824. The audit history report (or log) can include any appropriate information from audit history database 69 such as indications of previous domains to which new device 20 was registered or attempted to be registered (or simply an indication of the number of previous registrations and registration attempts), the date and possibly requester of previous audit history requests, timestamp information of requests, an indication of whether previous requests were nonceless, etc.

Turning to FIG. 9, flow 900 illustrates example operational steps that may be performed by modules of new device 20 in accordance with an embodiment of the system. Modules of new device 20 could be discrete or integrated in any suitable configuration based on particular needs. For ease of reference, however, flow 900 will be described without specific reference to particular modules of new device 20.

At 902, unconfigured, new device 20 can initiate adjacency discovery. Because new device 20 does not have a domain certificate, it can try to join a domain on all interfaces. Thus, new device 20 may initiate a bootstrap algorithm on all interfaces and attempt to join the first autonomic domain that is presented to it. New device 20 can only join one domain, and receives from the domain updated configuration (intent), image upgrades, autonomic code upgrades, etc., which could substantially change the behavior and capabilities of the device. While associated to a domain, it new device 20 may not attempt a further bootstrap.

New device 20 can send an adjacency discovery message to a peer or neighboring device, such as existing device 30. A discovery message can include the device identifier (e.g., manufacturer's secure UDI, unsecure UDI) and a blank or null domain certificate. At this point, new device 20 does not have the credentials or authorization to join domain 15. Therefore, new device 20 simply waits for existing device 30 (or another existing device on another interface) to provide a completed information package.

Because an attacker could present a false domain on a directly connected device, new device 20 is responsible for verifying that the domain presented by an existing device is the domain that new device 20 is authorized to join. If new device 20 is tricked into joining an attacker's domain, new device 20 could be fully subverted by the attacker. In this situation, the attacker can select a modified or an older IOS image or autonomic code or configuration that gives them access to identified vulnerabilities. If, or when, new device 20 is subsequently joined to the proper authorized target domain, detecting and cleaning new device 20 of malware can be extremely difficult. Accordingly, new device 20 verifies messages presented by registration server 40, which include the authorization signature of signing authority 60.

If a completed information package is not received at 904, then flow passes to 924 and new device 20 does not join domain 15, because new device 20 has not verified that domain 15 (presented by existing device 30) is the domain new device 20 is authorized to join. If a completed information package is received, then at 906, new device 20 can check for a nonce and then validate the trust chain of the completed information package. First, if it is determined at 906 that a nonce is not included with the completed information package at, then the package is accepted and flow passes to 910 to validate the trust chain of the completed information package. If a nonce is included in the completed information package, however, then flow passes to 908 and new device 20 determines whether the nonce is accurate (e.g., whether the received nonce is equivalent to the nonce previously generated by new device 20). If the nonce is not accurate, flow passes to 924 and new device 20 does not join domain 15. Otherwise, if the nonce is accurate, then flow passes to 910 to validate the trust chain of the completed information package.

The trust chain of the completed information package can be validated by verifying the authorization signature of signing authority 60 and verifying signing authority 60 is trusted. If the trust chain is validated, then the information in the completed information package (e.g., domain hash) is also validated. If the trust chain of the completed information package is not validated (i.e., authorization signature of signing authority 60 is not verified or signing authority 60 is not trusted), as determined at 912, then flow passes to 924 and new device 20 does not join domain 15. However, if the authorization signature is verified and the signing authority is trusted (e.g., signing authority server certificate is verified), then flow passes to 914 where new device 20 is configured with the domain identifier. In addition, if the completed information package contains additional information (other than an authorization token) such as a new domain-specific device identifier, then new device 20 may also be configured with the new domain-specific device identifier. At 916, new device 20 may create an RSA key-pair (e.g., public/private keys) using the new domain-specific device identifier and the domain identifier.

Once the completed information package has been validated, automatic enrollment in domain 15 is enabled, and may be achieved using any suitable protocols. In one example process using SCEP protocol, at 918, new device 20 creates a certification enrollment request and then sends it to registration server 40 (e.g., via existing device 30) in order to register with registration server at 920. If a signed certificate is not received from registration server 40, as determined at 922, then the registration was not successful and flow passes to 924 where new device 20 does not join domain 15. If new device 20 receives a signed certificate, as determined at 922, then registration was successful and flow passes to 926 where new device 20 installs the certificate. Once the certificate is installed, new device 20 can initiate adjacency discovery and join domain 15.

In some implementations, the completed information package is signed by registration server 40, and this signature can be verified by new device 20 at 910. If the completed information package is not signed by registration server 40, however, then new device 40 can verify registration server 40 in subsequent communications after the trust chain of the completed information package is validated.

In example implementations, at least some portions of the activities related to the system for enabling unconfigured devices to securely join an autonomic network, outlined herein may be implemented in software in, for example, unconfigured new devices (e.g., new device 20), registration servers (e.g., registration server 40), and signing authorities (e.g., signing authority 60). In some embodiments, this software could be received or downloaded from a web server, provided on computer-readable media, or configured by a manufacturer of a particular element (e.g., new device 20) in order to provide this system for enabling unconfigured devices to securely join an autonomic network. In some embodiments, one or more of these features may be implemented in hardware, provided external to these elements, or consolidated in any appropriate manner to achieve the intended functionality.

In one example implementation, new device 20, existing device 30, registration server 40, certification authority 50, and signing authority 60 are network elements or computing devices, which may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information. In some example embodiments, registration server 40 could be implemented as a separate network element such as a server. In other example embodiments, the functionalities of registration server 40 could be implemented in a new or existing network element of domain 15, such as a wireless LAN controller. New device 20 represents any network element or computing device that is unconfigured when initially deployed in an autonomic network including, for example, routers, switches, servers, gateways, computing devices (e.g., desktops, laptops, tablets, etc.), smart phones, etc.

Furthermore, in the embodiments of the system for enabling unconfigured devices to securely join an autonomic network, described and shown herein, some of the processors and memory elements associated with the various network elements may be removed, or otherwise consolidated such that a single processor and a single memory location are responsible for certain activities. For example, signing authority 60 and registration server 40 could be consolidated into a single server within network domain 15, such that the functionality of signing authority 60 is provided locally rather than remotely as a cloud service. Alternatively, certain processing functions could be separated and separate processors and/or physical machines could implement various functionalities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of the example embodiments, one or more memory elements (e.g., main memory 73, secondary storage 74, computer-readable medium 79, customer policies database 67, device database 68, audit history database 69, audit history policies database 47) can store data used for the automatic configuration and registration operations described herein. This includes at least some of the memory elements being able to store instructions (e.g., software, logic, code, etc.) that are executed to carry out the activities described in this Specification. A processor can execute any type of instructions associated with the data to achieve the operations detailed herein in this Specification. In one example, one or more processors (e.g., processor 72) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Components of network environment 10 (e.g., new device 20, existing device 30, registration server 40, certification authority 50, signing authority 60) may keep information in any suitable type of memory (e.g., random access memory (RAM), read-only memory (ROM), erasable programmable ROM (EPROM), electrically erasable programmable ROM (EEPROM), etc.), software, hardware, or in any other suitable component, device, element, or object where appropriate and based on particular needs. Any of the memory items discussed herein should be construed as being encompassed within the broad term 'memory element.' The information being read, used, tracked, sent, transmitted, communicated, or received by network environment 10 could be provided in any database, register, queue, table, cache, control list, or other storage structure, all of which can be referenced at any suitable timeframe. Any such storage options may be included within the broad term 'memory element' as used herein. Similarly, any of the potential processing elements and modules described in this Specification should be construed as being encompassed within the broad term 'processor.'

Note that with the numerous examples provided herein, interaction may be described in terms of two, three, four, or more network elements. However, this has been done for purposes of clarity and example only. It should be appreciated that the system can be consolidated in any suitable manner.

Along similar design alternatives, any of the illustrated computers, modules, components, and elements of the FIGURES may be combined in various possible configurations, all of which are clearly within the broad scope of this Specification. In certain cases, it may be easier to describe one or more of the functionalities of a given set of flows by only referencing a limited number of network elements. It should be appreciated that the system for automatically configuring and registering an unconfigured device in an autonomic network, as shown in the FIGURES, and its teachings are readily scalable and can accommodate a large number of components, as well as more complicated/sophisticated arrangements and configurations. Accordingly, the examples provided should not limit the scope or inhibit the broad teachings of the system as potentially applied to a myriad of other architectures.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

In the foregoing description, for purposes of explanation, numerous specific details are set forth in order to provide a thorough understanding of the disclosed embodiments. It will be apparent to one skilled in the art, however, that the disclosed embodiments may be practiced without these specific details. In other instances, structure and devices are shown in block diagram form in order to avoid obscuring the disclosed embodiments. In addition, references in the Specification to 'one embodiment', 'example embodiment', 'an embodiment', 'another embodiment', 'some embodiments', 'various embodiments', 'other embodiments', 'alternative embodiment', etc. are intended to mean that any features (e.g., elements, structures, modules, components, steps, operations, characteristics, etc.) associated with such embodiments are included in one or more embodiments of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A method, comprising:
    creating an initial information package for a device attempting to join an autonomic network domain of a network environment, wherein the device is autonomic and unconfigured and wherein the creating is performed automatically and without human intervention;
    communicating the initial information package to a signing;
    receiving an authorization token from the signing authority;
    sending the authorization token to the unconfigured device, wherein the unconfigured device validates the authorization token based on a credential in the unconfigured device;
    receiving an audit history report of the unconfigured device, wherein the audit history report comprises information regarding previous attempts by the unconfigured device to join the network environment;
    applying a policy to the unconfigured device based on the audit history report;
    generating a completed information package, wherein the completed information package includes the authorization token; and
    applying a second signature to the completed information package, wherein the sending the authorization token to the unconfigured device includes sending the completed information package to the unconfigured device, and wherein the unconfigured device validates the second signature on the completed information package.

2. The method of claim 1, wherein the unconfigured device validates the authorization token by:
    verifying the authorization token was created by the signing authority; and
    verifying the signing authority is trusted based on the credential.

3. The method of claim 1, further comprising:
    receiving a message containing a unique device identifier (UDI) of the unconfigured device.

4. The method of claim 3, further comprising:
    determining the validity of the unconfigured device to connect to the domain;
    determining a device type of the unconfigured device; and
    determining whether the unconfigured device is authorized to connect to an interface in the domain.

5. The method of claim 3, wherein the initial information package includes the unique device identifier of the unconfigured device and a domain identifier of the domain.

6. The method of claim 5, wherein the signing authority creates the authorization token by applying an authorization signature to the unique device identifier and the domain identifier.

7. The method of claim 1, wherein the credential on the unconfigured device includes a manufacturing installed certificate, and wherein the manufacturing installed certificate is a root of a signing authority certificate of the signing authority.

8. The method of claim 1, wherein the signing authority determines whether the unconfigured device is authorized to join the domain, and wherein the signing authority creates the authorization token if the unconfigured device is authorized to join the domain.

9. The method of claim 1, wherein the signing authority determines whether the unconfigured device is authorized to join the domain based on a customer policy.

10. The method of claim 1, wherein the credential includes a manufacturing installed certificate with an Institute of Electrical and Electronics Engineers (IEEE) 802.1AR initial device identifier (IDevID) and a root public key of a manufacturer.

11. The method of claim 1, wherein the policy prevents the unconfigured device from joining the domain if the audit history report indicates the unconfigured device was previously registered to a different domain in the network environment.

12. The method of claim 1, wherein if the unconfigured device validates the authorization token, the unconfigured device automatically enrolls in the domain.

13. The method of claim 1, further comprising:
    receiving a certificate request from the device after the device validates the authorization token;

generating a certificate signed by a certification authority of the domain; and sending the certificate to the device, thereby enabling the device to join the domain.

14. The method of claim 1, wherein the signing authority is a cloud resource.

15. Logic encoded in one or more non-transitory computer-readable media that includes code for execution and when executed by a processor is operable to perform operations comprising:

creating an initial information package for a device attempting to join an autonomic network domain of a network environment, wherein the device is autonomic and unconfigured and wherein the creating is performed automatically and without human intervention;

communicating the initial information package to a signing authority;

receiving an authorization token from the signing authority;

sending the authorization token to the unconfigured device, wherein the unconfigured device validates the authorization token based on a credential in the unconfigured device;

receiving an audit history report of the unconfigured device, wherein the audit history report comprises information regarding previous attempts by the unconfigured device to join the network environment; and applying a policy to the unconfigured device based on the audit history report;

generating a completed information package, wherein the completed information package includes the authorization token; and applying a second signature to the completed information package, wherein the sending the authorization token to the unconfigured device includes sending the completed information package to the unconfigured device, and wherein the unconfigured device validates the second signature on the completed information package.

16. An apparatus, comprising:
a memory element configured to store data;
a processor operable to execute instructions associated with the data; and
an information package module configured to interface with the memory element and the processor, wherein the apparatus is configured to:

create an initial information package for a device attempting to join an autonomic network domain of a network environment, wherein the device is autonomic and unconfigured and wherein the creating is performed automatically and without human intervention;

communicate the initial information package to a signing authority;

receive an authorization token from the signing authority;

send the authorization token to the unconfigured device, wherein the unconfigured device validates the authorization token based on a credential in the unconfigured device;

receive an audit history report of the unconfigured device, wherein the audit history report comprises information regarding previous attempts by the unconfigured device to join the network environment; and apply a policy to the unconfigured device based on the audit history report;

generate a completed information package, wherein the completed information package includes the authorization token; and apply a second signature to the completed information package, wherein the sending the authorization token to the unconfigured device includes sending the completed information package to the unconfigured device, and wherein the unconfigured device validates the second signature on the completed information package.

17. The apparatus of claim 16, wherein the initial information package includes a unique device identifier of the unconfigured device and a domain identifier of the domain.

18. The apparatus of claim 17, wherein the signing authority determines whether the unconfigured device is authorized to join the domain, and wherein the signing authority creates the authorization token if the unconfigured device is authorized to join the domain.

19. The apparatus of claim 18, wherein the signing authority determines whether the unconfigured device is authorized to join the domain by determining whether the domain identifier in the initial information package corresponds to a root certificate in a certification authority of the domain.

20. The apparatus of claim 18, wherein the signing authority creates the authorization token by applying an authorization signature to the unique device identifier and the domain identifier.

21. The apparatus of claim 20, wherein if the unconfigured device validates the authorization token, the unconfigured device automatically enrolls in the domain.

* * * * *